United States Patent
Kingsmill et al.

(10) Patent No.: US 10,194,279 B2
(45) Date of Patent: *Jan. 29, 2019

(54) METHODS, SYSTEMS, AND PRODUCTS FOR ENHANCED LOCATION

(71) Applicant: AT&T Intellectual Property I, L.P., Atlanta, GA (US)

(72) Inventors: Kirk Kingsmill, Duluth, GA (US); Robert Johnston, Atlanta, GA (US); Jeffery Russell, Auburn, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/234,034

(22) Filed: Aug. 11, 2016

(65) Prior Publication Data

US 2016/0353250 A1 Dec. 1, 2016

Related U.S. Application Data

(63) Continuation of application No. 14/526,556, filed on Oct. 29, 2014, now Pat. No. 9,439,045.

(51) Int. Cl.
*H04W 4/80* (2018.01)
*H04W 4/04* (2009.01)
*H04M 1/725* (2006.01)

(52) U.S. Cl.
CPC .......... *H04W 4/04* (2013.01); *H04M 1/7253* (2013.01); *H04M 1/72533* (2013.01); *H04M 1/72572* (2013.01); *H04W 4/80* (2018.02)

(58) Field of Classification Search
CPC ...................................... H04W 4/04
USPC ........................................................ 455/456.1
See application file for complete search history.

(56) References Cited

U.S. PATENT DOCUMENTS

| | | |
|---|---|---|
| 7,038,584 B2 | 5/2006 | Carter |
| 8,041,369 B2 | 10/2011 | Smith et al. |
| 8,258,654 B2 | 9/2012 | Parsons |
| 2006/0209857 A1 | 9/2006 | Hicks, III |
| 2009/0049466 A1 | 2/2009 | Schoettle et al. |
| 2010/0277306 A1 | 11/2010 | Leinen et al. |
| 2012/0302219 A1* | 11/2012 | Vang ............... H04W 4/023 455/414.1 |
| 2013/0181834 A1 | 7/2013 | Bentley et al. |
| 2014/0077929 A1 | 3/2014 | Dumas et al. |
| 2014/0117780 A1 | 5/2014 | Buchheim et al. |
| 2014/0148049 A1* | 5/2014 | Rosenblum ......... H01R 25/006 439/534 |
| 2014/0162690 A1 | 6/2014 | Sheikman et al. |
| 2014/0171120 A1* | 6/2014 | Callahan ............... H04L 67/20 455/456.3 |
| 2014/0357254 A1* | 12/2014 | Delbary ............... G08C 17/02 455/420 |

* cited by examiner

*Primary Examiner* — Qutbuddin Ghulamali
(74) *Attorney, Agent, or Firm* — Scott P. Zimmerman, PLLC

(57) ABSTRACT

Location may be determined based on electrical outlets in a home or business. One or more of the electrical outlets may wirelessly communicate with a mobile device, thus updating a database with the location of the mobile device. As the mobile device moves within the home or business, a current location of the mobile device may be continually logged by passing one of the electrical outlets. Rules and operations may then be performed, based on the current location.

19 Claims, 39 Drawing Sheets

METHODS, SYSTEMS, AND PRODUCTS FOR ENHANCED LOCATION

CROSS-REFERENCE TO RELATED APPLICATION

This application is a continuation of U.S. application Ser. No. 14/526,556 filed Oct. 29, 2014 and since issued as U.S. Pat. No. 9,439,045, which is incorporated herein by reference in its entirety.

BACKGROUND

Locational determination is common in today's communications environment. Many mobile devices, such as smartphones, determine location using the Global Positioning System. However, the Global Positioning System is often unavailable indoors.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
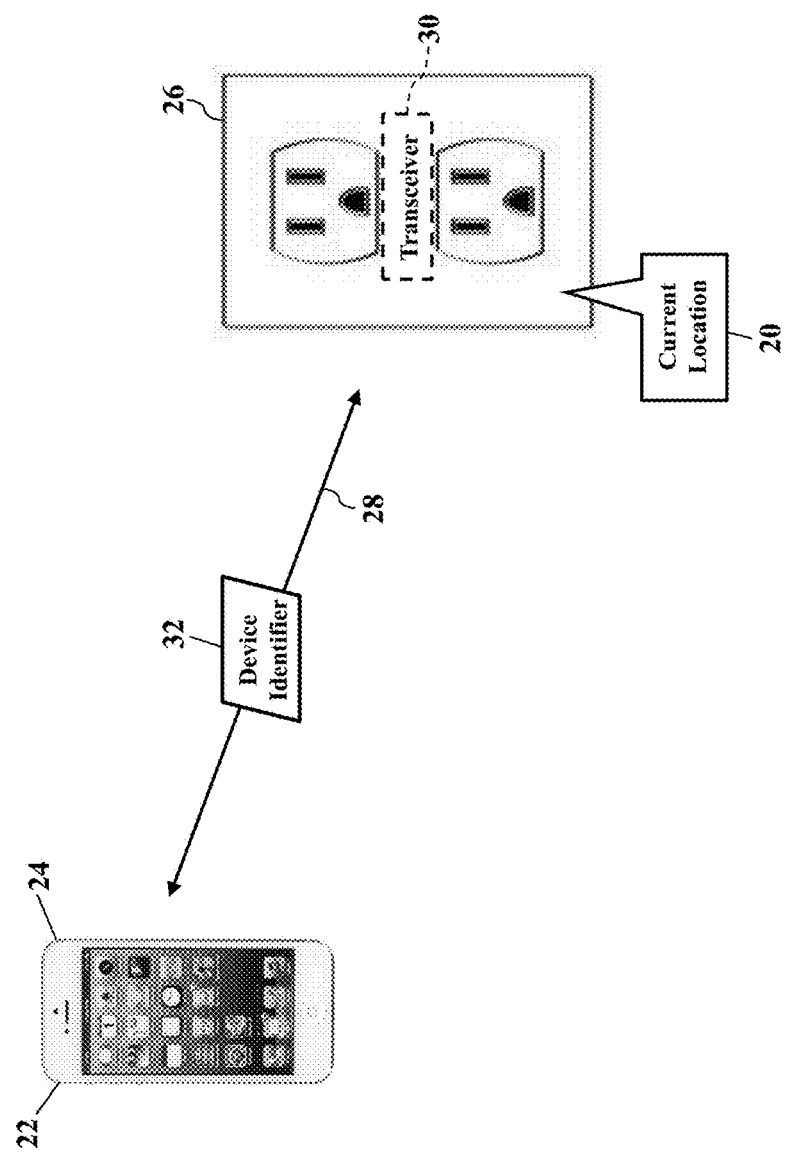
FIGS. 1-8 are simplified schematics illustrating an environment in which exemplary embodiments may be implemented.

FIGS. 1-8 are simplified schematics illustrating an environment in which exemplary embodiments may be implemented. FIG. 1 illustrates an indoor positioning system that determines a current location 20 of a mobile device 22. For simplicity, the mobile device 22 is illustrated as a smartphone 24. The mobile device 22, however, may be any processor-controlled device, as later paragraphs will explain. Regardless, as the smartphone 24 is carried within an indoor environment (such as home or business), the smartphone 24 passes near an electrical outlet 26 of an electrical distribution system. As the smartphone 24 passes, the electrical outlet 26 receives a wireless signal 28 sent from the smartphone 24. The electrical outlet 26, for example, has a transceiver 30 that permits the electrical outlet 26 to wirelessly communicate with the smartphone 24. When the transceiver 30 receives the wireless signal 28, the transceiver 30 inspects the wireless signal 28 for a device identifier 32. The device identifier 32 uniquely identifies the smartphone 24.

Figure 2:
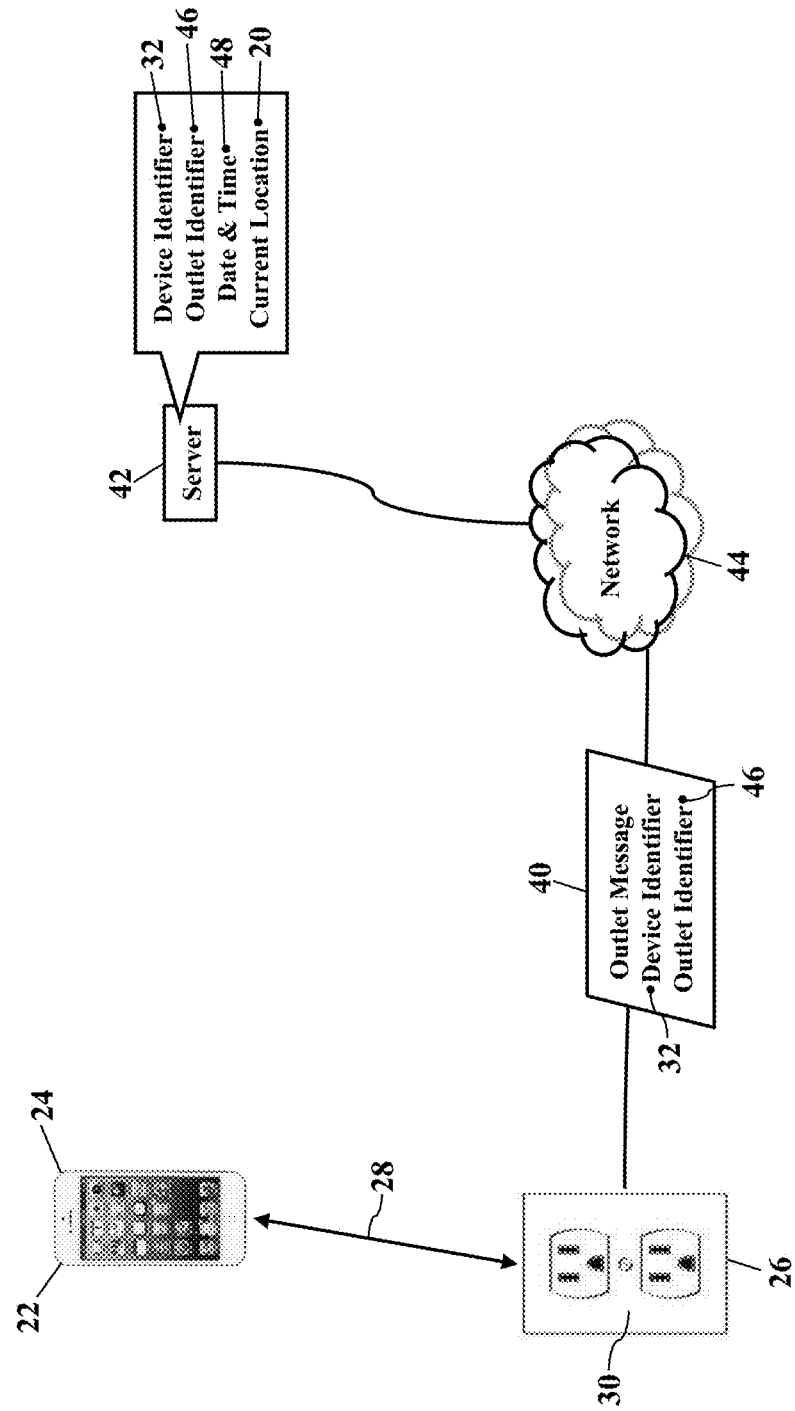

FIG. 2 illustrates location determination. If the transceiver 30 detects the wireless signal 28 from the smartphone 24, the smartphone 24 may be currently located within a proximate, short distance from the electrical outlet 26. Indeed, if low power transmission is used (such as BLUETOOTH® or near field communication), the smartphone 24 may be currently located only a few, or perhaps several, feet from the electrical outlet 26. The electrical outlet 26 sends an outlet message 40 to any device or destination, such as a server 42. The outlet message 40 informs the server 42 of the detected presence of the smartphone 24. The outlet message 40, for example, may be packetized and sent into a communications network 44 and routed to a network address associated with the server 42. The outlet message 40 includes the device identifier 32 that uniquely identifies the smartphone 24. However, the outlet message 40 also includes an outlet identifier 46 that uniquely identifies the transceiver 30 in the electrical outlet 26. When the server 42 receives the outlet message 40, the server 42 inspects the outlet message 40 for the device identifier 32 and for the outlet identifier 46. The server 42 thus now knows that, at the current date and time 48, the mobile device 22 has the current location 20 identified by the outlet identifier 46 associated with the electrical outlet 26.

Figure 3:
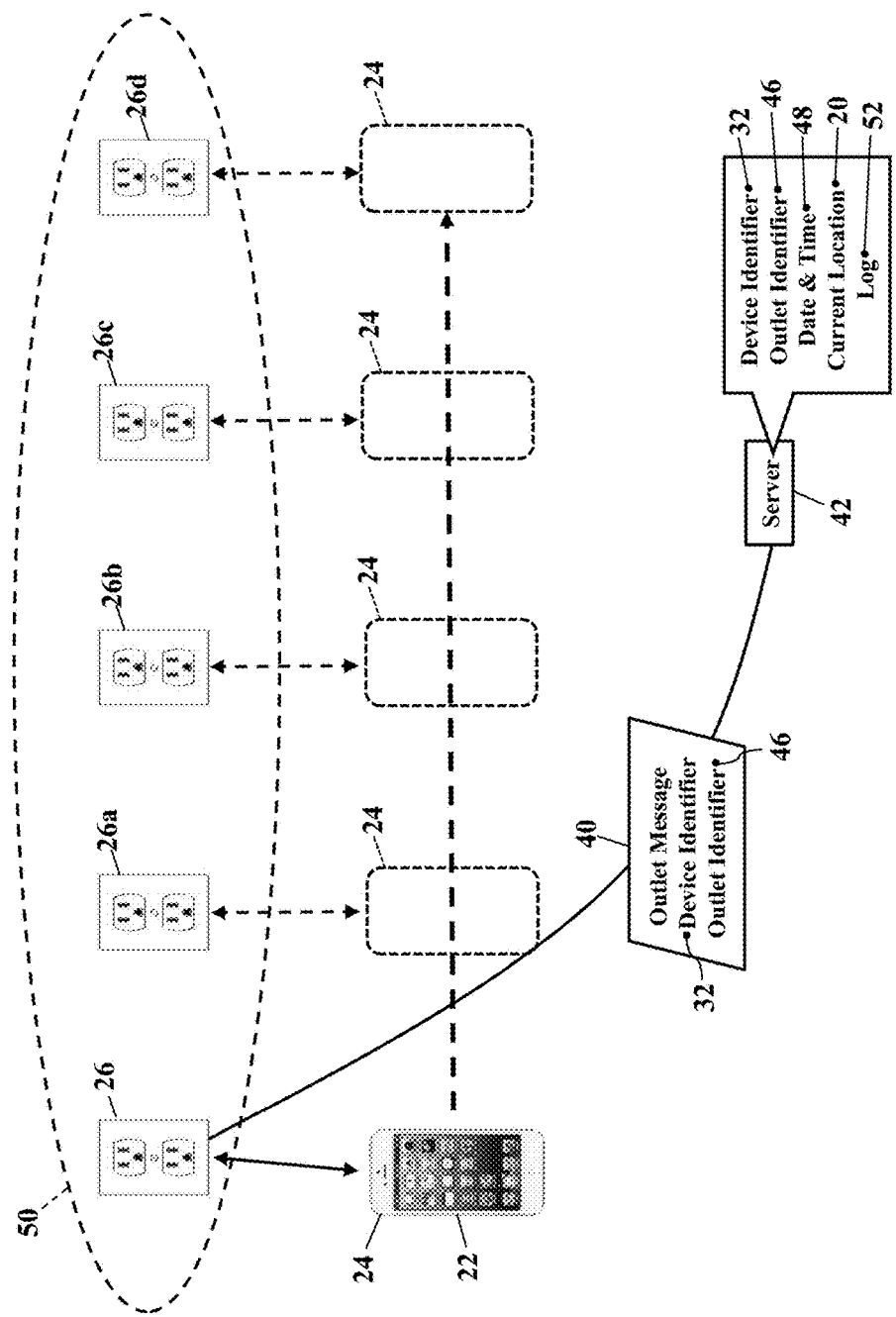

FIG. 3 illustrates route tracking. As the reader knows, many homes and businesses have an electrical distribution system 50 that provides electrical power to homes and businesses. The electrical distribution system 50 usually has many different electrical outlets 26. Indeed, the NATIONAL ELECTRICAL CODE® specifies a maximum spacing between adjacent electrical outlets 26. So, as the smartphone 24 moves within the home or business, exemplary embodiments track the movement. That is, as the user's smartphone 24 travels down a hall or within a room, exemplary embodiments track the current location 20 of the smartphone 24, based on a sequence of the outlet messages 40 received from the different electrical outlets 26 at different dates and times 48. As the user's smartphone 24 passes within reception vicinity of one of the electrical outlets 26, communication is established. The server 42 thus receives the outlet message 40 from the corresponding electrical outlet 26. However, as the user's smartphone 24 continues to move, the smartphone 24 will move into communications range with an adjacent electrical outlet 26b. Each respective electrical outlet 26 thus informs the server 42 of the current location 20 of the mobile smartphone 24. Over time, then, the server 42 may maintain a chronological log 52 of the successive current locations 20 of the user's smartphone 24, as reported by the different electrical outlets 26 of the electrical distribution system 50.

Figure 4:
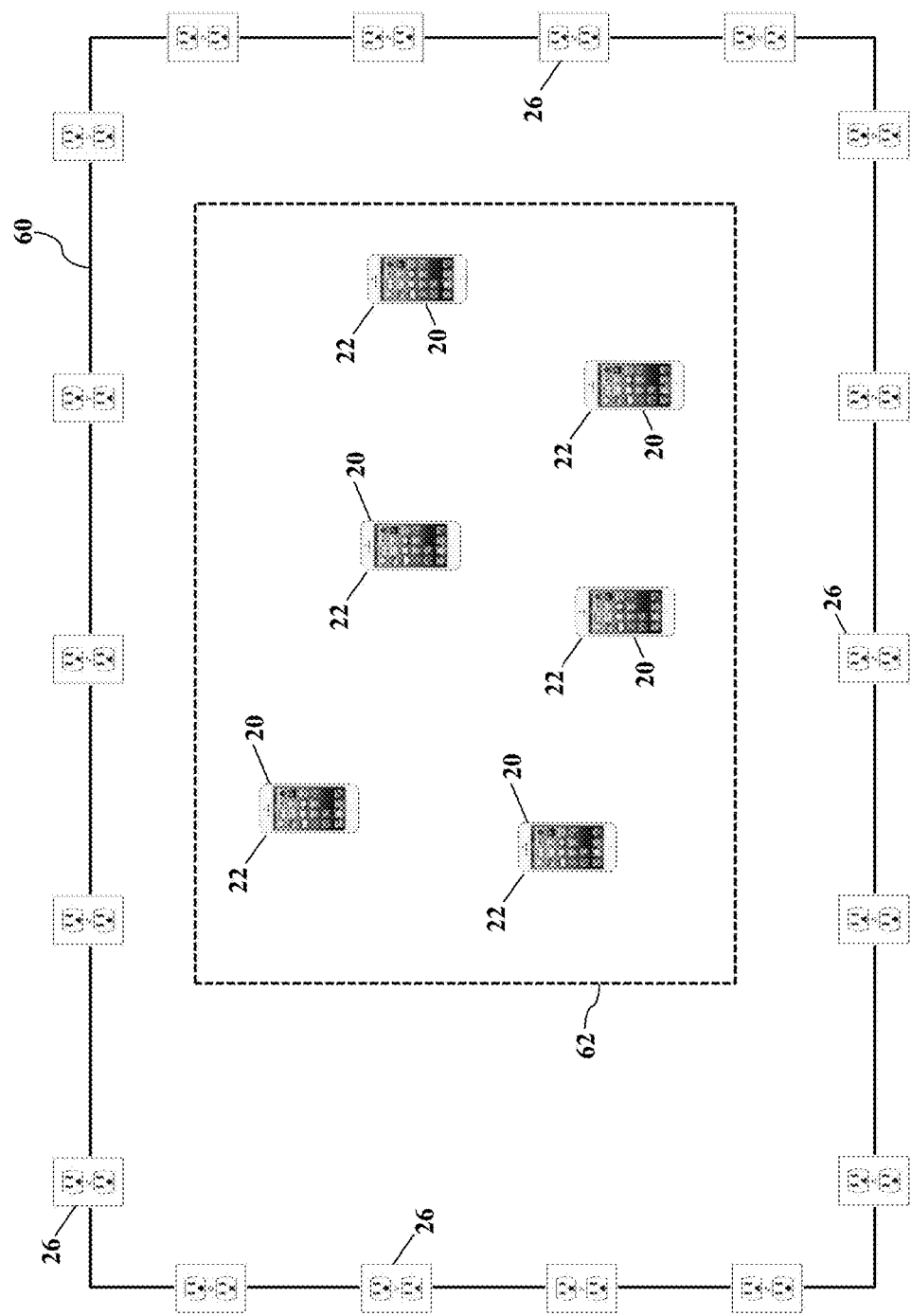

FIG. 4 illustrates group tracking. Here the server 42 may track the movements of different users, based on the current locations 20 of their respective mobile devices 22. FIG. 4 illustrates a room 60 having many electrical outlets 26 along its walls. As any user's mobile device 22 passes one of the electrical outlets 26, exemplary embodiments may log its corresponding current location 20. Even if a group 62 of mobile devices operates in the same room or area, exemplary embodiments may individually log their current locations 20. Each member of the group 62 may thus be tracked in proximity to the electrical outlets 26 in the room 60.

Figure 5:
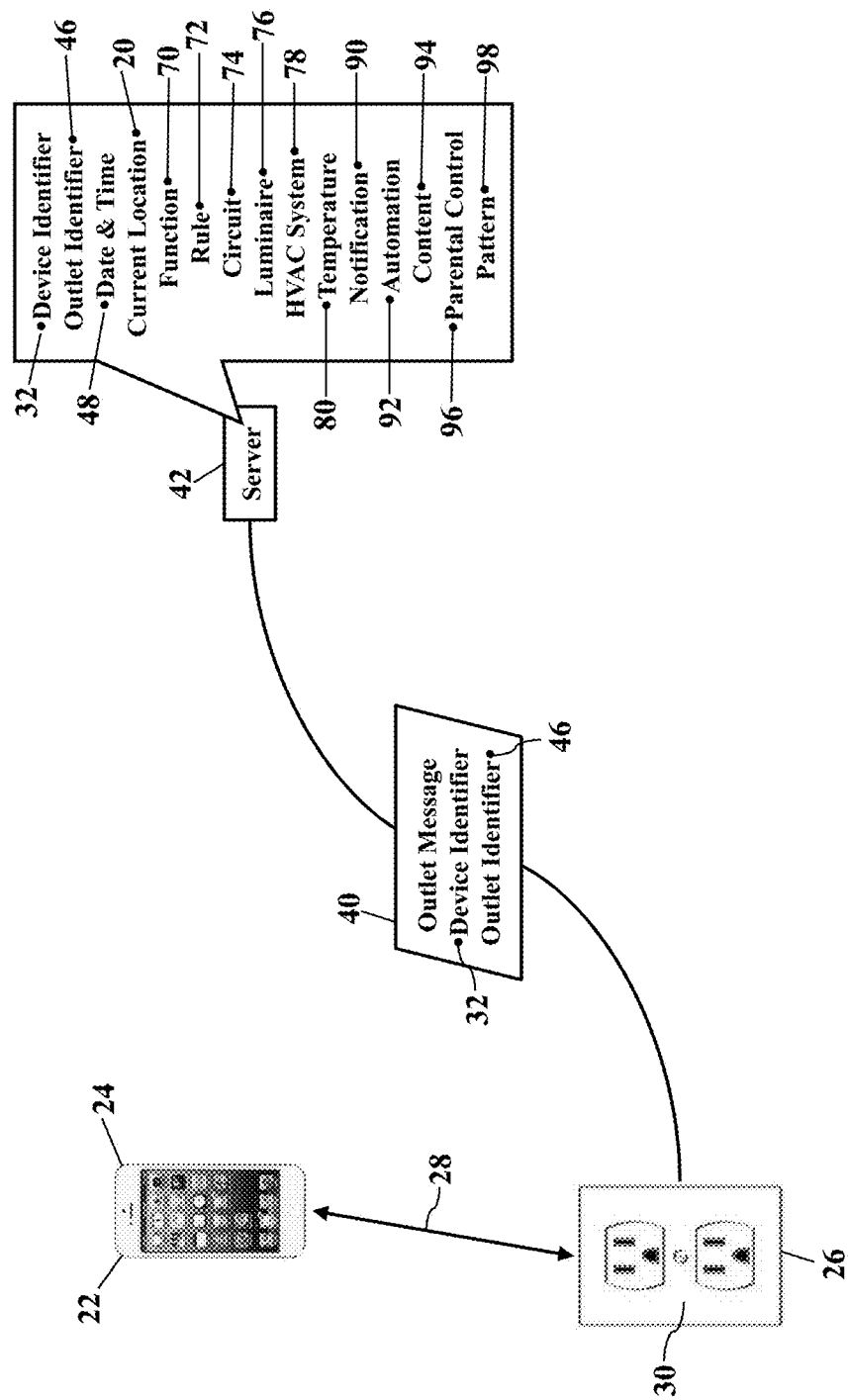

FIG. 5 illustrates some locational features. Once the current location 20 is known, exemplary embodiments may then execute any function 70 or rule 72, based on the current location 20. For example, the server 42 may activate (or "turn on") one or more lighting circuits 74 associated with the current location 20. In other words, when the smartphone 24 establishes communication with the electrical outlet 26, the server 42 may activate one individual lighting luminaire 76 or the entire lighting circuit 74 associated with the electrical outlet 26. The server 42 may also command a heating, ventilation, and air conditioning ("HVAC") system 78 to heat or cool the area associated with the electrical outlet 26. That is, as the mobile device 22 acts as a proxy for the user, a preprogrammed temperature 80 may be commanded for the user's comfort. Likewise, when the smartphone 24 moves out of range, the electrical outlet 26 may no longer receive the wireless signal 28. Exemplary embodiments may then deactivate (or "turn off") the lighting luminaire 76 and the lighting circuit 74 to conserve electricity. The preprogrammed temperature 80 may also change to conserve energy.

Other features are controllable. When the current location 20 is determined, a notification 90 may be sent. That is, either the smartphone 24 and/or the server 42 may generate and send a text, email, or any other electronic message or call detailing the current location 20 of the mobile device 22. The server 42 may further implement home or office automation 92, such as activating a television or sound system. Indeed, exemplary embodiments may automatically select audio-visual or media content 94, based on profile preferences of the mobile device 22. Indeed, exemplary embodiments may even execute a parental control 96, based on the current location 20 of a minor child's mobile device 22. The server 42 may even compare habitual patterns 98 of locations to infer operations, such as activating a kitchen coffee brewer during the morning hours. These features, and others, will be further explained in the following paragraphs of this disclosure.

Figure 6:
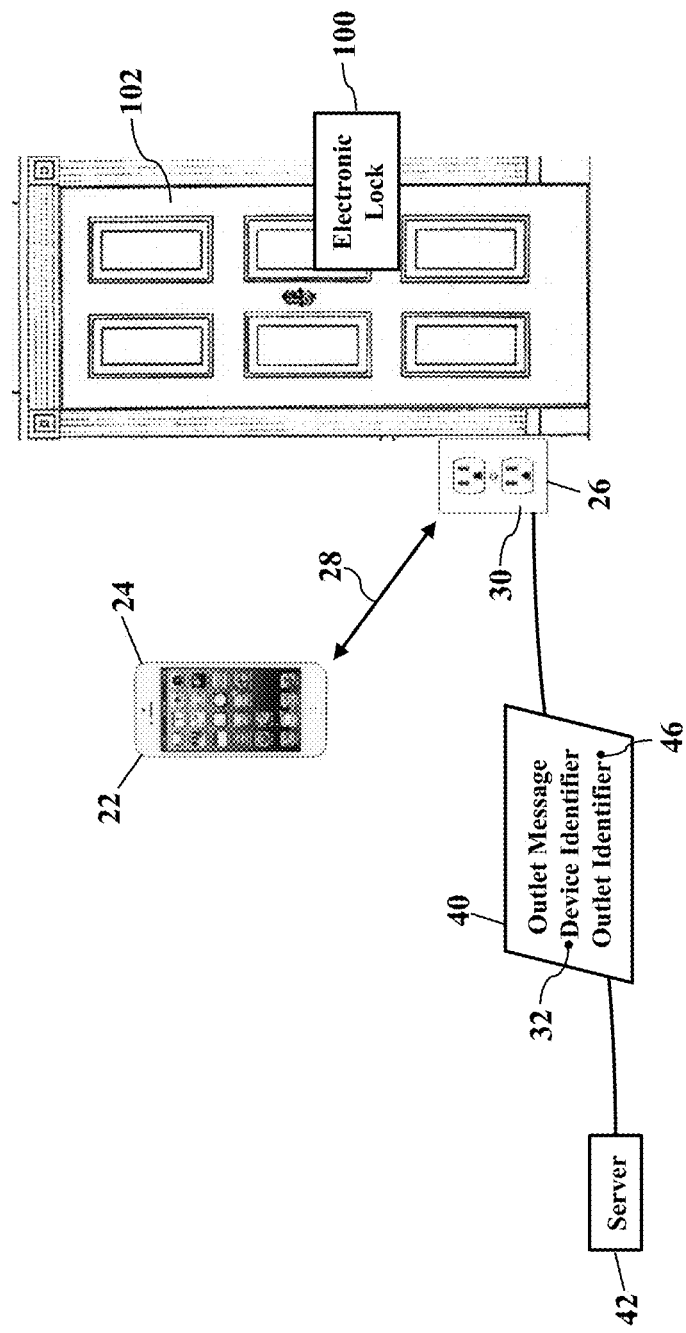

FIG. 6 illustrates access control. Here exemplary embodiments may be used to activate, or deactivate, an electronic lock 100. As the reader again likely understands, many homes and businesses have the electronic lock 100 that secures a door or window. Exemplary embodiments may thus lock, or unlock, the electronic lock 100 based on the current location 20 of the user's smartphone 24. For example, suppose the smartphone 24 establishes wireless communication with the electrical outlet 26 located outside a front door 102. When the server 42 receives the outlet message 40, the server 42 thus knows that the user is about to enter the home or business. The server 42 may thus send a command to the electronic lock 100, instructing the electronic lock 100 to automatically unlock. Similarly, when the mobile device 22 moves inside the door 102, a different electrical outlet (not shown for simplicity) will establish communication, thus updating the current location 20. The server 42 may thereafter command the electronic lock 100 to automatically lock. Exemplary embodiments may be applied to the reverse situation, in which the electronic lock 100 unlocks when the mobile device 22 approaches an inside electrical outlet.

Figure 7:
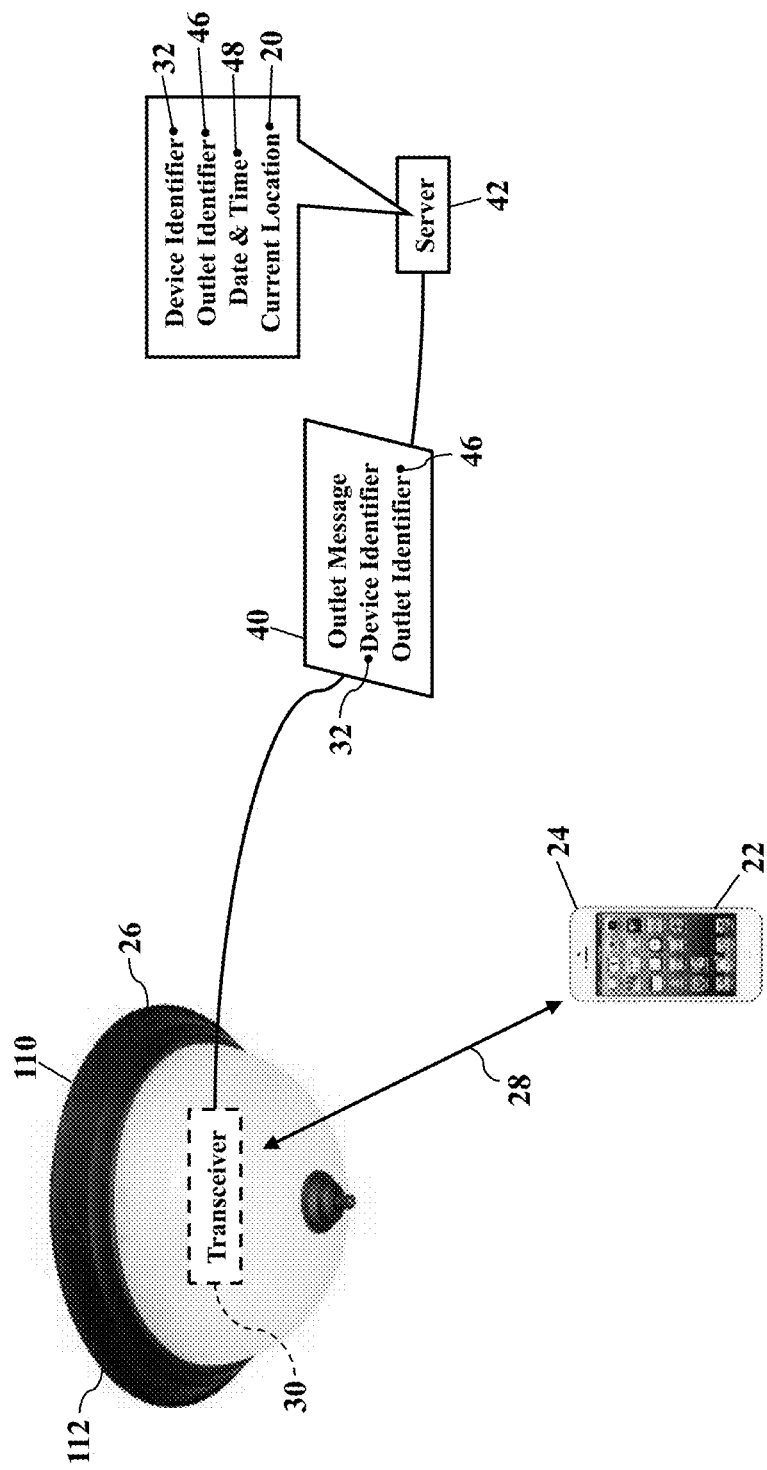

FIG. 7 illustrates a lighting fixture 110. The lighting fixture 110 is illustrated as a typical ceiling-mounted light 112. The lighting fixture 110, though, may be any lighting component, such as a lamp, nightlight, or ceiling fan. That is, the lighting fixture 110 is merely another electrical outlet 26 that draws electrical current, when considered as a component of the electrical distribution system 50. Indeed, the NATIONAL ELECTRICAL CODE® defines any electrical outlet 26 as any point on the electrical distribution system (illustrated as reference numeral 50 in FIG. 3) at which electrical current is taken. Here, though, the lighting fixture 110 may also include the transceiver 30, thus allowing the lighting fixture 110 to receive the wireless signal 28 transmitted from the mobile device 22 (such as the smartphone 24). The lighting fixture 110 sends the outlet message 40 to the server 42 to report the detected presence of the smartphone 24. When the server 42 receives the outlet message 40, the server 42 obtains the unique device identifier 32 and the unique outlet identifier 46 associated with the transceiver 30 and/or the lighting fixture 110. The server 42 thus now knows that, at the current date and time 48, the mobile device 22 has the current location 20 identified by the outlet identifier 46 associated with the transceiver 30 and/or the lighting fixture 110. Exemplary embodiments may thus be applied to any electrical component, such as the lighting fixture 110, switches, dimmers, and junction boxes found in most homes and businesses.

Figure 8:
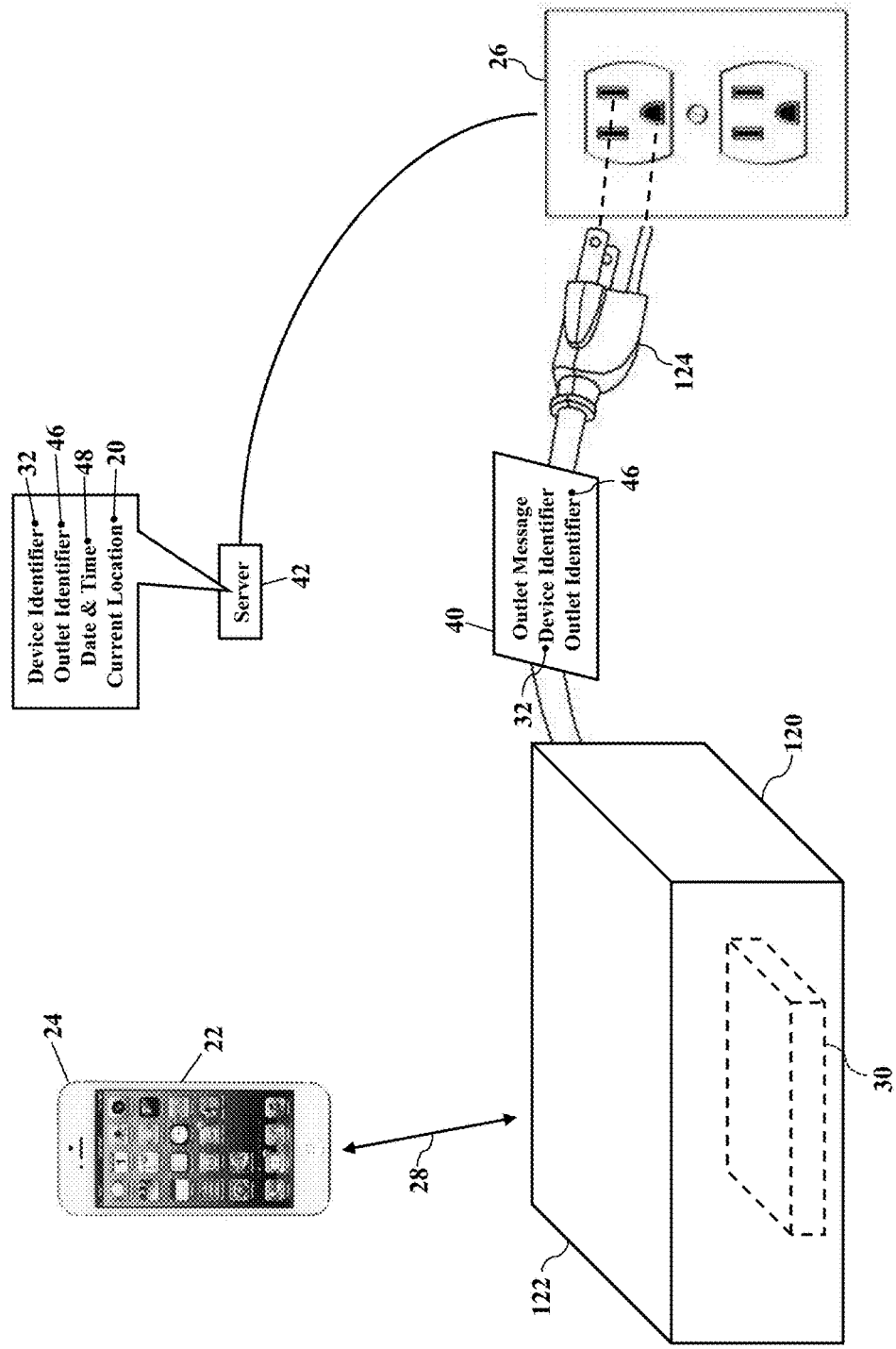

FIG. 8 illustrates a portable solution. Here exemplary embodiments may be adapted as a simple, plug-in component or apparatus 120 for easy use in existing homes and businesses. That is, the wireless transceiver 30 may be incorporated inside a hockey puck enclosure 122 for simple connection to the electrical outlet 26. The user simply places the enclosure 122 at any desired location within the home or business. The user inserts a corded plug 124 into a receptacle of the electrical outlet 26, as is widely known. The apparatus 120 thus receives electrical power, allowing the transceiver 30 to receive the wireless signal 28 transmitted from the mobile device 22 (such as the smartphone 24). The apparatus 120 sends the outlet message 40 to the server 42 to report the detected presence of the smartphone 24. FIG. 8, for example, illustrates powerline communication, in which the outlet message 40 is sent over the electrical wires, which is well known and need not be explained. When the server 42 receives the outlet message 40, the server 42 obtains the unique device identifier 32 and the unique outlet identifier 46 associated with the transceiver 30 in the apparatus 120. The server 42 thus now knows that, at the current date and time 48, the mobile device 22 has the current location 20 proximate to the apparatus 120. The apparatus 120 may thus be placed at any location within the home or business to detect the current location 20 of the mobile devices 22 passing within reception vicinity. The apparatus 120 easily adapts to existing electrical systems with little or no retrofit.

Exemplary embodiments thus present an elegant solution for indoor positioning. Microwave transmission and reception may experience severe scatter in indoor environments, thus rendering the Global Positioning System unreliable or even inoperable. Exemplary embodiments, though, determine location using intelligent electrical outlets 26 found in nearly all buildings. Exemplary embodiments provide a central system that processes the user's current location 20, in real time or near real time, using the mobile device 22 as a proxy. The current location 20 is determined based on proximity to the electrical outlets 26.

Exemplary embodiments thus use wireless transmission and reception for location determination. Any wireless transmission and/or reception may be used, based on proximity to the electrical outlets 26 having the transceiver 30. The transceiver 30, for example, may utilize the existing electrical wiring to send the outlet message 40 to the server 42, thus pinpointing the current location 20 of any user (via their mobile device 22).

Exemplary embodiments are also applicable to outdoor environments. As the reader knows, many outdoor environments also have electrical outlets. Even if the user's mobile device 22 operates in an outdoor environment, exemplary embodiments may still be used to determine the current location 20. Indeed, there may be many situations in which locational determination, using the electrical outlets 26, is preferable. For example, traditional cellular usage often requires fees and charges, so locational determination using the electrical outlets 26 may be cheaper. Moreover, if cellular service is weak or slow, locational determination using the electrical outlets 26 may be faster and preferable. So, exemplary embodiments may be preferable in outdoor environments.

Figure 9:
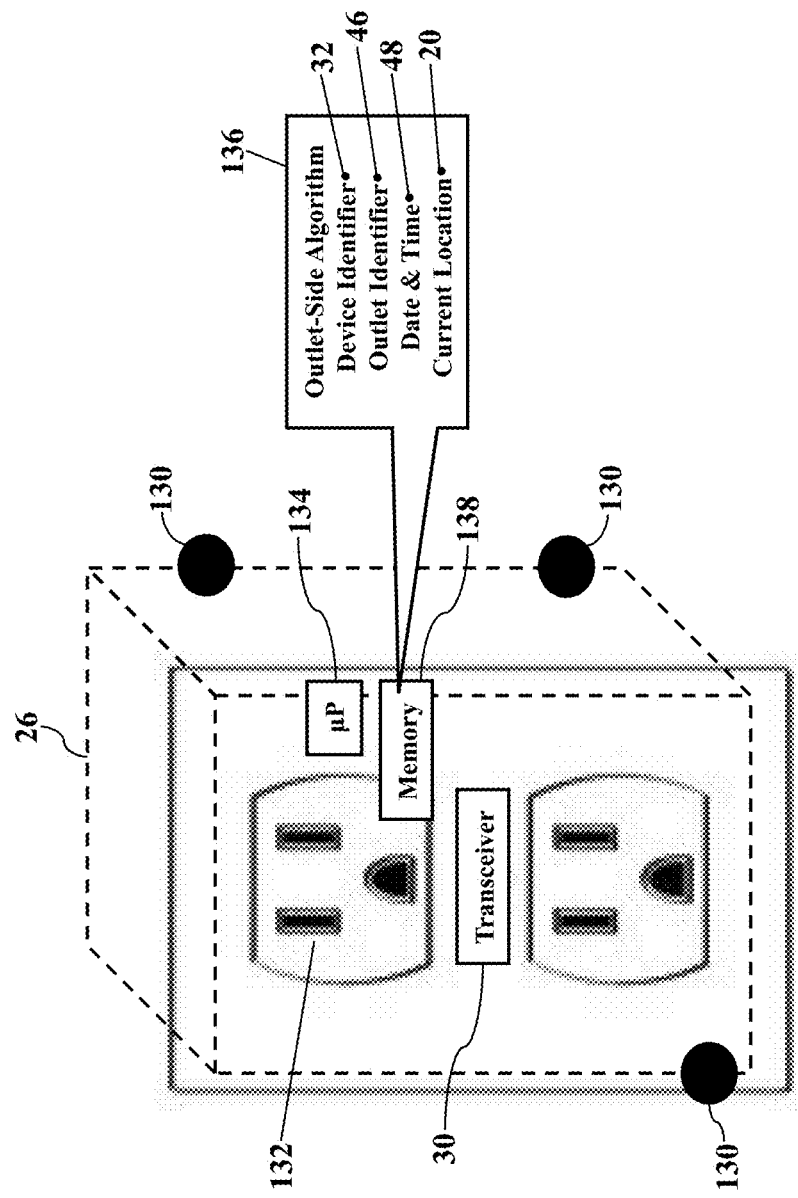
FIGS. 9-12 are more detailed block diagrams illustrating an outlet and a server, according to exemplary embodiments.

FIGS. 9-12 are more detailed block diagrams illustrating the outlet 26 and the server 42, according to exemplary embodiments. As FIG. 9 illustrates, the electrical outlet 26 has conventional terminals 130 for connection to the energized or "hot," neutral, and ground wires of the electrical distribution system. The electrical outlet 26 may also have the conventional female socket or receptacle 132 for insertion of a male plug, as is universally known. Here, though, the electrical outlet 26 may also have a processor 134 (e.g., "μP"), application specific integrated circuit (ASIC), or other component that executes an outlet-side algorithm 136 stored in a memory 54. The outlet-side algorithm 136 is a set of programming, code, or instructions that cause the processor 134 to perform operations, such as commanding the transceiver 30 to receive the wireless signal sent by the passing mobile device (illustrated, respectively, as reference numerals 28 and 22 in FIGS. 1-8).

The device identifier 32 is obtained. Once the wireless signal 28 is received, the outlet-side algorithm 136 then instructs the processor 134 to inspect the wireless signal 28 for the device identifier 32. The device identifier 32 uniquely identifies the mobile device 22. As those of ordinary skill understand, each different mobile device 22 may have any unique alphanumeric device identifier 32. The passing smartphone 24, for example, may be uniquely identified by its telephone number, IP address, media access control address (or "MAC address"), transceiver identifier, or any other differentiator. Whatever the unique device identifier 32, the device identifier 32 is sent as some informational content in the wireless signal 28.

Figure 10:
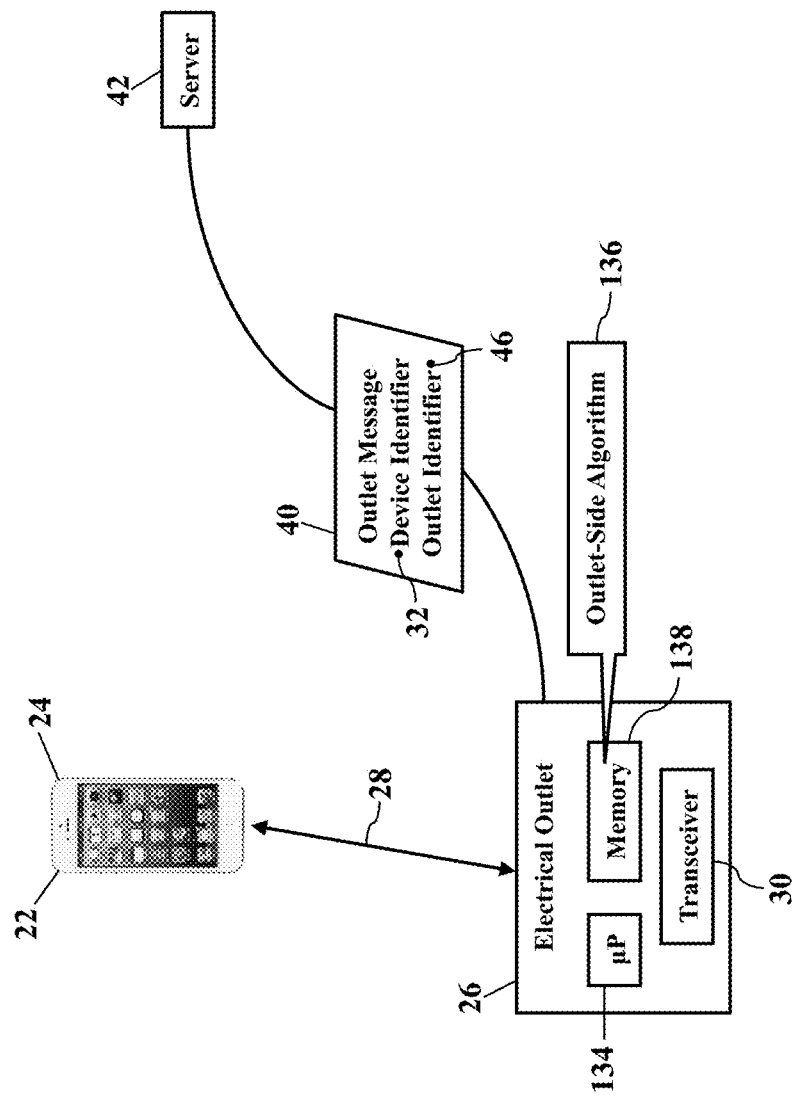

FIG. 10 illustrates the outlet message 40. As the user's mobile device 22 is passing near the electrical outlet 26, exemplary embodiments log the current location 20. That is, the outlet-side algorithm 136 instructs the processor 134 to generate the outlet message 40 that reports the current location 20 of the passing mobile device 22. The processor 134 generates the outlet message 40 to include the device identifier 32 (that uniquely identifies the mobile device 22) as informational content. The outlet-side algorithm 136, however, may also instruct the processor 134 to include the outlet identifier 46 as informational content. The outlet identifier 46 is another alphanumeric combination that uniquely identifies the electrical outlet 26. The outlet identifier 46, for example, may uniquely identify the transceiver 30 in the electrical outlet 26. However, the outlet identifier 46 may be any other unique character combination. Once the processor 134 generates the outlet message 40, the outlet message 40 may be sent into the communications network 44 (illustrated in FIG. 1) and routed to the network address associated with the server 42.

Figure 11:
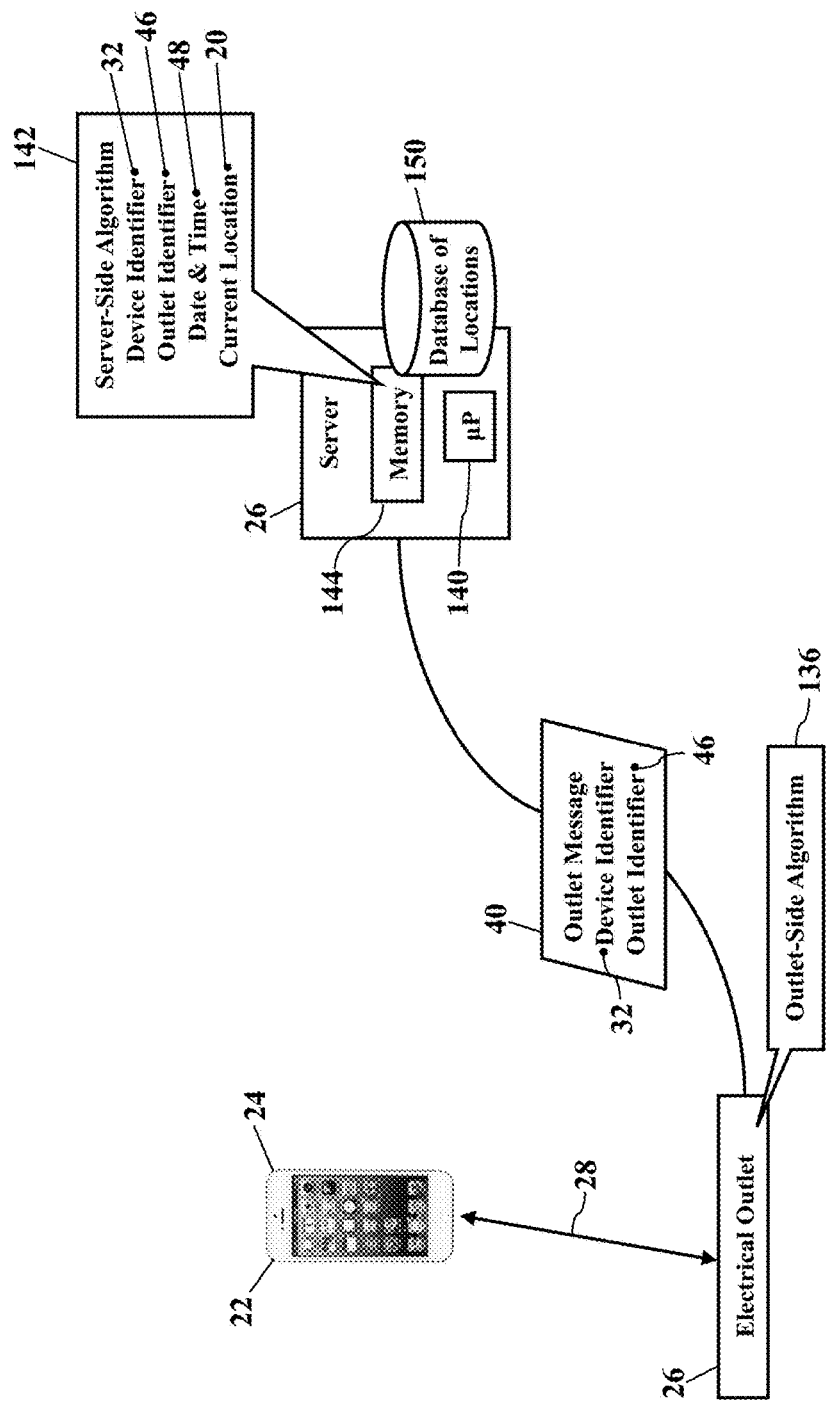

FIG. 11 illustrates the server 42. When the server 42 receives the outlet message 40, the server 42 logs the current location 20 of the mobile device 22. The server 42 may have its own processor 140 (e.g., "μP"), application specific integrated circuit (ASIC), or other component that executes a server-side algorithm 142 stored in a memory 144. The server-side algorithm 142 is a set of programming, code, or instructions that cause the processor 140 to perform operations, such as inspecting the outlet message 40 for the device identifier 32 and for the outlet identifier 46. The server 42 then logs the current location 20 in a database 150 of locations.

Figure 12:
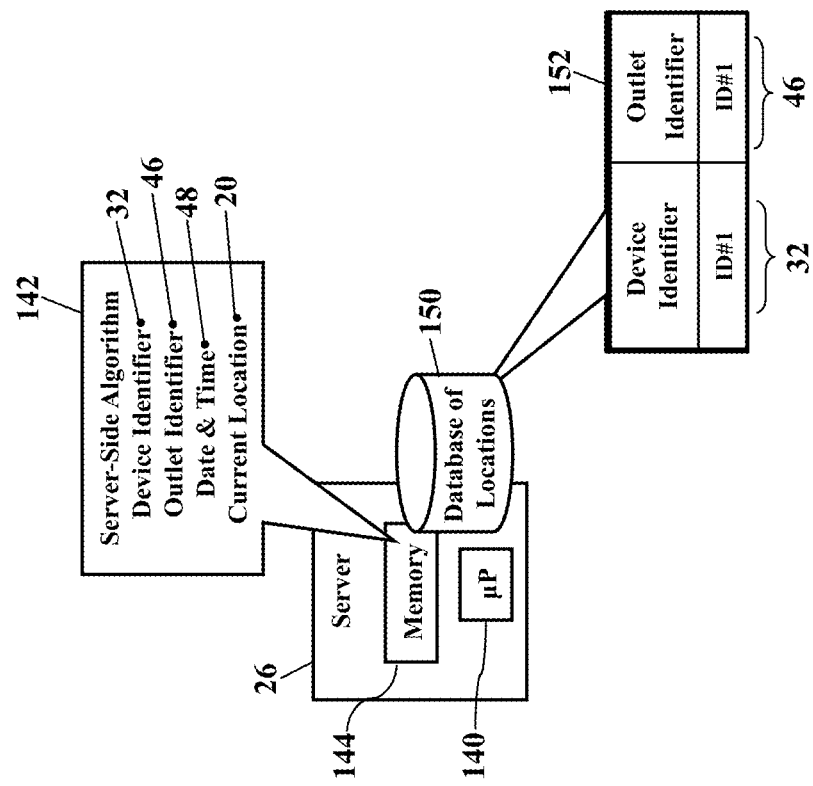

FIG. 12 further illustrates the database 150 of locations. Once the server 42 receives the outlet message 40, the server-side algorithm 142 knows that the device identifier 32 (uniquely representing the mobile device 22) has established wireless communication with the electrical outlet 26 (represented by the outlet identifier 46). The server-side algorithm 142 is thus informed of the mobile device 22 having the current location 20 identified by the outlet identifier 46 associated with the electrical outlet 26. The processor 140 may thus log the outlet message 40 in the database 150 of locations. FIG. 12 illustrates the database 150 of locations as being locally stored in the memory 144 of the server 42, but the database 150 of locations may be remotely accessed at any network location from any communications network. Regardless, the database 150 of locations is illustrated as a table 152 that maps or associates the device identifier 32 to the outlet identifier 46, thus identifying the corresponding electrical outlet 26 as the current location 20 of the user's mobile device 22.

Exemplary embodiments may be applied regardless of networking environment. Exemplary embodiments may be easily adapted to cellular, WI-FI®, and/or BLUETOOTH® networking technologies. The networking environment may even include electrical powerline wiring, as this disclosure explains. Exemplary embodiments may utilize BLUETOOTH®, near-field, and/or any other portion of the electromagnetic spectrum and any signaling standard (such as the IEEE 802 family of standards, GSM/CDMA/TDMA or any cellular standard, and/or the ISM band). Exemplary embodiments may use the radio-frequency domain and/or the Internet Protocol (IP) domain. Exemplary embodiments may be applied to any distributed computing network, such as the Internet (sometimes alternatively known as the "World Wide Web"), an intranet, a local-area network (LAN), and/or a wide-area network (WAN). Exemplary embodiments may be applied regardless of physical componentry, physical configuration, or communications standard(s).

Exemplary embodiments may utilize any processing component, configuration, or system. The processors 134 and 140 may be one or multiple processors, which could include distributed processors or parallel processors in a single machine or multiple machines. The processors 134 and 140 may be used in supporting a virtual processing environment. The processors 134 and 140 could include a state machine, application specific integrated circuit (ASIC), programmable gate array (PGA) including a Field PGA, or state machine. When any of the processors 134 and 140 execute instructions to perform "operations", this could include the 134 and 140 performing the operations directly and/or facilitating, directing, or cooperating with another device or component to perform the operations.

Figure 13:
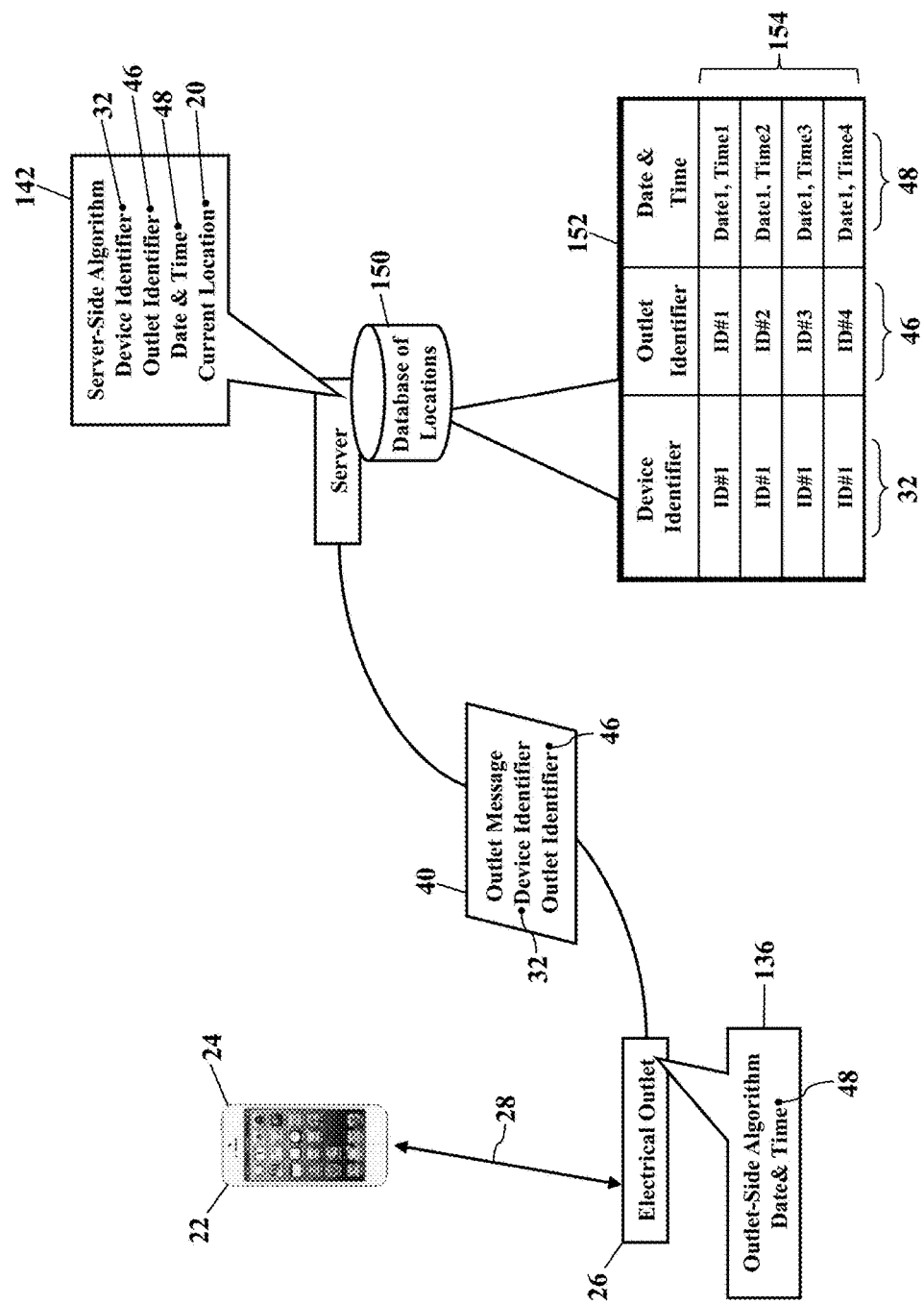
FIG. 13 is a schematic illustrating time stamping, according to exemplary embodiments.

FIG. 13 is a schematic illustrating time stamping, according to exemplary embodiments. As the mobile device 22 is carried, its current location 20 changes with time. Exemplary embodiments, then, may use time stamps to further define the current location 20. The outlet-side algorithm 136, for example, may stamp the outlet message 40 with the date and time 48 of receipt of the wireless signal 28. Alternatively, the outlet message 40 may be stamped with the date and time 48 it is sent to the server 42. Still another option is to stamp the outlet message 40 with the date and time 48 of receipt by the server 42. Regardless, exemplary embodiments may further log the date and time 48 in the database 150 of locations. That is, as the mobile device 22 is carried throughout the home or business, the mobile device 22 passes into and out of communication with different electrical outlets along the halls and rooms. The database 150 of locations may thus have entries that chronologically log different current locations 20 of the mobile device 22 at different dates and times 48. The different current locations 20 may thus be a time series 154 of different outlet identifiers 46 as the mobile device 22 passes the corresponding electrical outlets 26.

Figure 14:
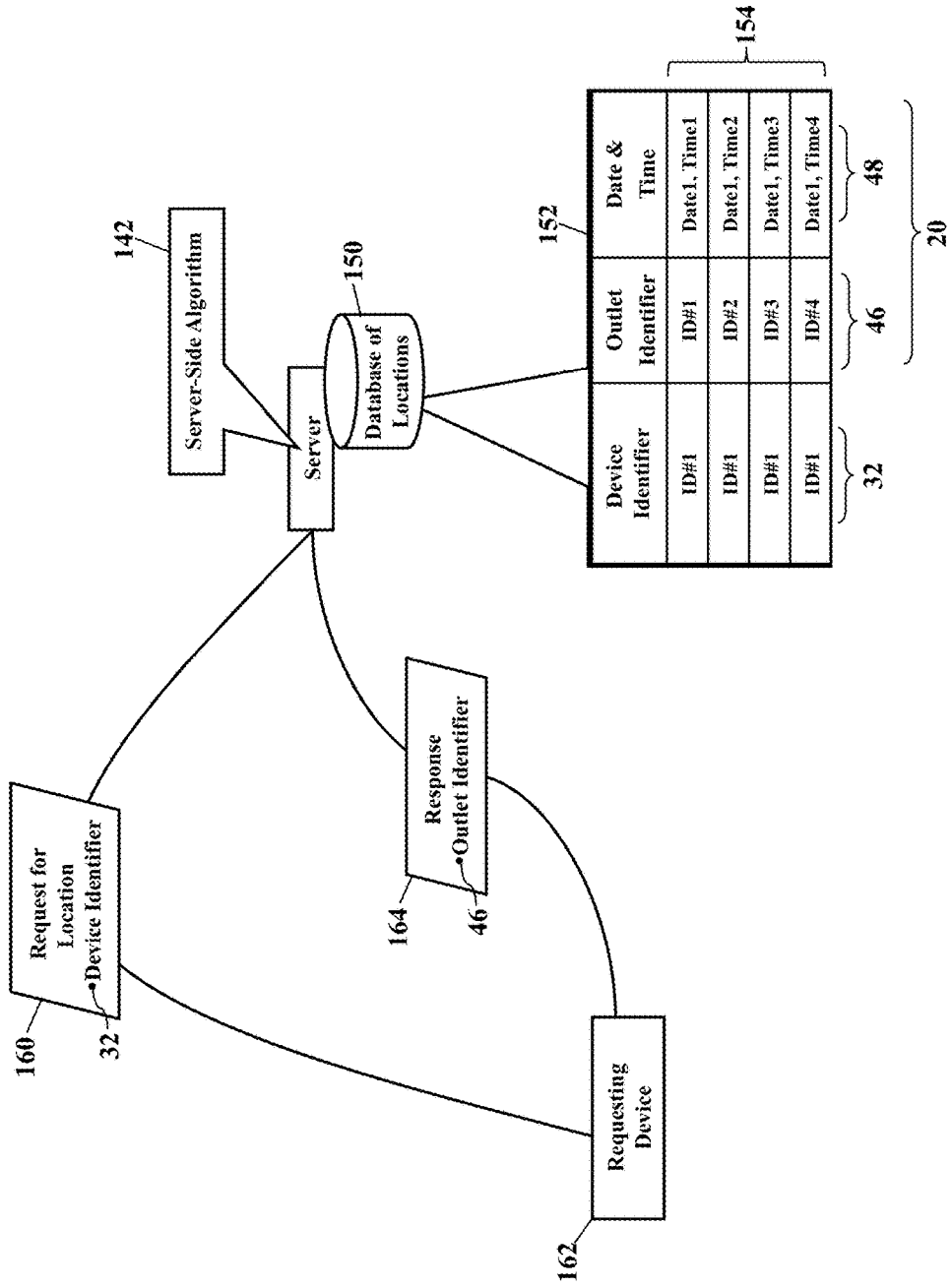
FIGS. 14-15 are more schematics illustrating locational determination, according to exemplary embodiments.
Figure 15:
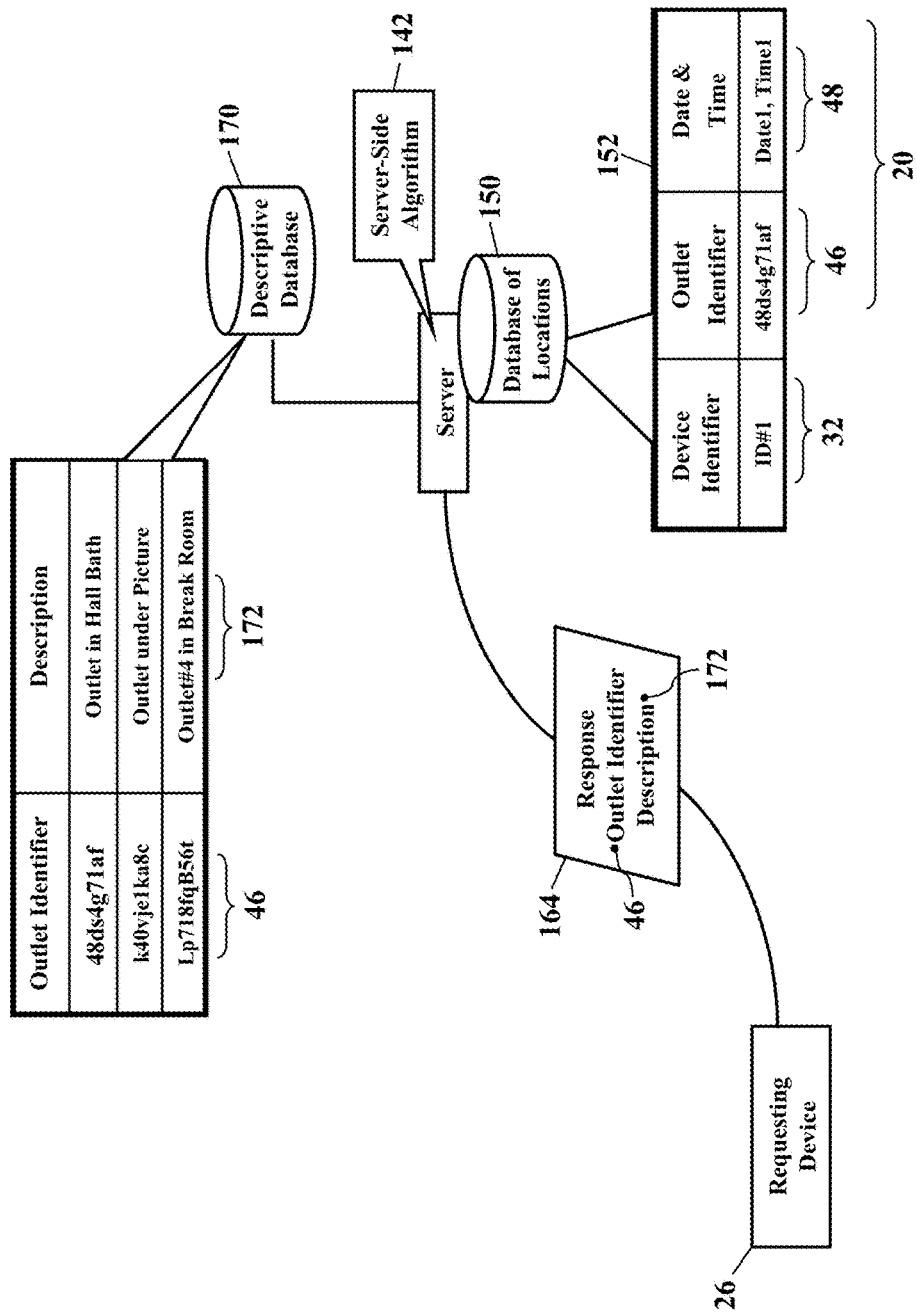

FIGS. 14-15 are more schematics illustrating locational determination, according to exemplary embodiments. As the mobile device 22 is carried, exemplary embodiments may generate a comprehensive log of the movements of the user's mobile device 22. The database 150 of locations may thus have many entries detailing the device identifier 32, the date and time 48, and the outlet identifier 46 reported by the electrical outlets in the home or business. Indeed, each time the mobile device 22 passes a different electrical outlet 26, exemplary embodiments may add a new entry to the database 150 of locations. The database 150 of locations may thus become a rich repository of the movements of the mobile device 22, in relation to the electrical outlets 26 installed throughout the home or business.

FIG. 14 illustrates locational queries. FIG. 14 illustrates a request 160 for location sent from some requesting device 162. The request 160 for location routes into and through the communications network to the network address associated with the server 42. The request 160 for location requests the current location 20 of the mobile device 22 having the corresponding device identifier 32. When the server 42 receives the request 160 for location, the server-side algorithm 142 causes the server 42 to query the database 150 of locations for the device identifier 32. The server 42 retrieves the latest or most recent entry for the corresponding device identifier 32, according to the date and time 48. The server 42, for example, retrieves the latest reported outlet identifier 46 associated with the corresponding device identifier 32. The server 42 generates a response 164 and includes the latest reported outlet identifier 46 as informational content. The response 164 is sent to the network address associated with the requesting device 162.

FIG. 14 also illustrates historical tracking. As the database 150 of locations builds its entries during the days and weeks, over time exemplary embodiments provide a detailed, historical account of the movements of the mobile device 22, again in relation to the electrical outlets 26 installed throughout the home or business. When the server 42 receives the request 160 for location, any historical information may also be retrieved. The request 160 for location, for example, may specify any previous or past date and time 48 for which location information is desired. The server 42 may thus query the database 150 of locations for a matching entry. The request 160 for location may even specify a range or period of dates and times, such as an hour's or day's log of movements. Whatever the query parameter, the server 42 retrieves any matching entries and sends the response 164.

FIG. 15 illustrates outlet descriptions. Exemplary embodiments log the movements of the mobile device 22, in relation to the outlet identifiers 46 of the corresponding electrical outlets 26 installed throughout the home or business. Each outlet identifier 46, though, may be an alphanumeric code that is meaningless to most people. Exemplary embodiments, then, may further include a descriptive database 170. The descriptive database 170 associates a textual description 172 to each outlet identifier 46. Whenever exemplary embodiments determine the current location 20 of the mobile device 22 (as represented by the corresponding outlet identifier 46), exemplary embodiments may query the descriptive database 170 for the textual description 172 associated with the outlet identifier 46. For example, if the current location 20 is represented by "48ds4g71af" as the outlet identifier 46, most people and systems would not have a true understanding of that current location 20. Exemplary embodiments, though, may consult the descriptive database 170 for the associated textual description 172, such as "electrical outlet in hall bathroom" or "electrical junction box hidden behind family picture." The textual description 172 may thus be retrieved and added to the response 164 to provide human or system context.

Figure 16:
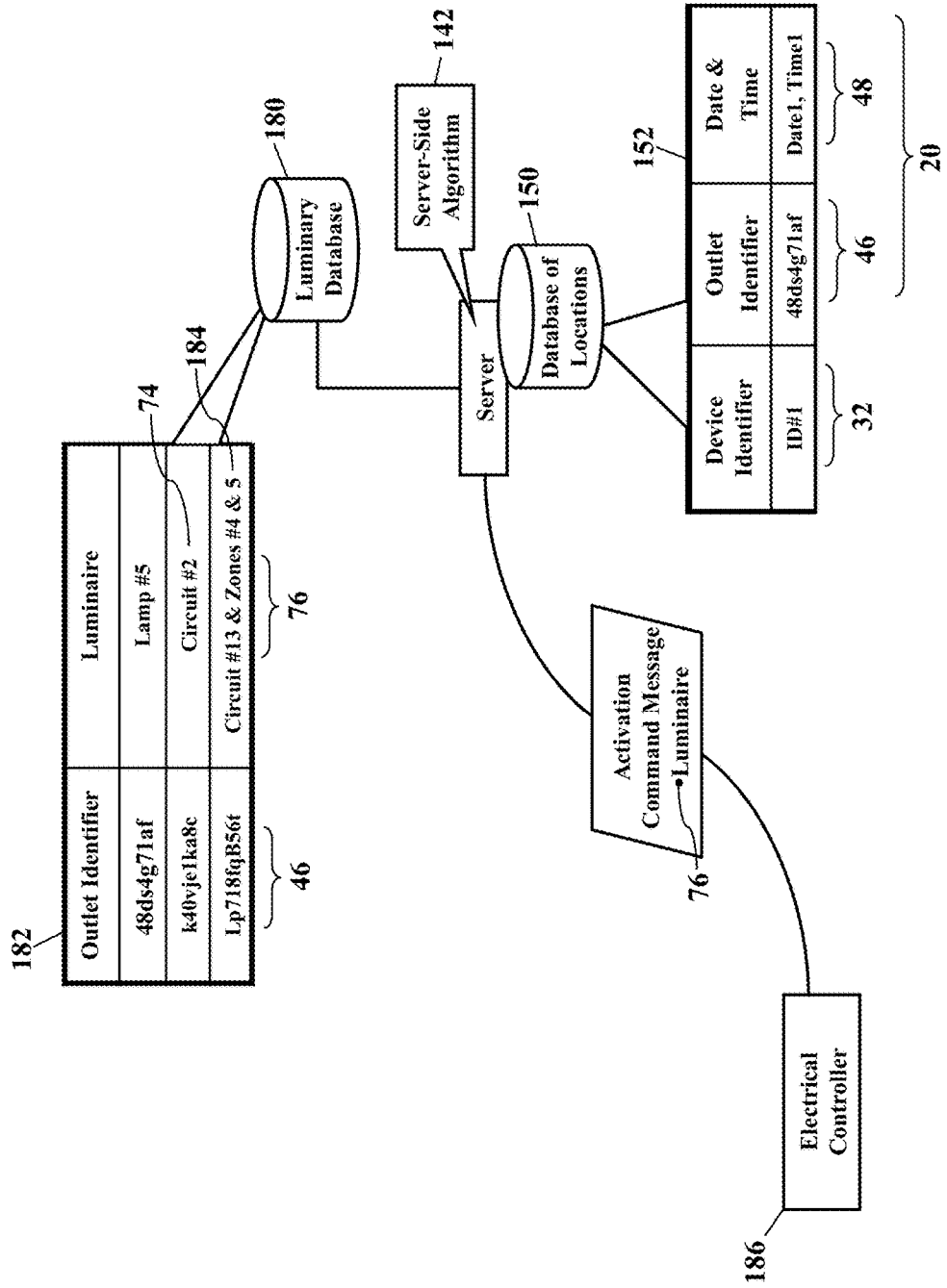
FIGS. 16-19 are schematics illustrating luminary activation, according to exemplary embodiments.

FIGS. 16-19 are schematics illustrating luminary activation, according to exemplary embodiments. Once the current location 20 of the mobile device 22 is known, exemplary embodiments may activate, or deactivate, the lights in the corresponding location. FIG. 16, for example, illustrates a luminary database 180. Once the current location 20 of the mobile device 22 is known (as reported by the electrical outlet 26 having the outlet identifier 46), exemplary embodiments may consult the luminary database 180 for the lights and lamps associated with the same electrical outlet 26. The luminary database 180 may be locally stored in the server 42 or remotely maintained and queried from any network location or address. Regardless, the luminary database 180 is illustrated as a table 182 that maps different outlet identifiers 46 to different luminaires 76. Once the current location 20 of the mobile device 22 is known (as reported by the corresponding outlet identifier 46), the server 42 may query the luminary database 180 and retrieve the corresponding luminaires 76 that should be activated. Each luminaire 76 may be identified by a unique name or alphanumeric code. An entry in the luminary database 180 may even specify that an entire electrical zone 184 or circuit 74 be activated. Once the server 42 retrieves the corresponding one or more luminaires 76, the server 42 may then send a command or message to an electrical controller 186. The electrical controller 186 activates the corresponding luminaires 76, in response to the current location 20 of the mobile device 22.

Figure 17:
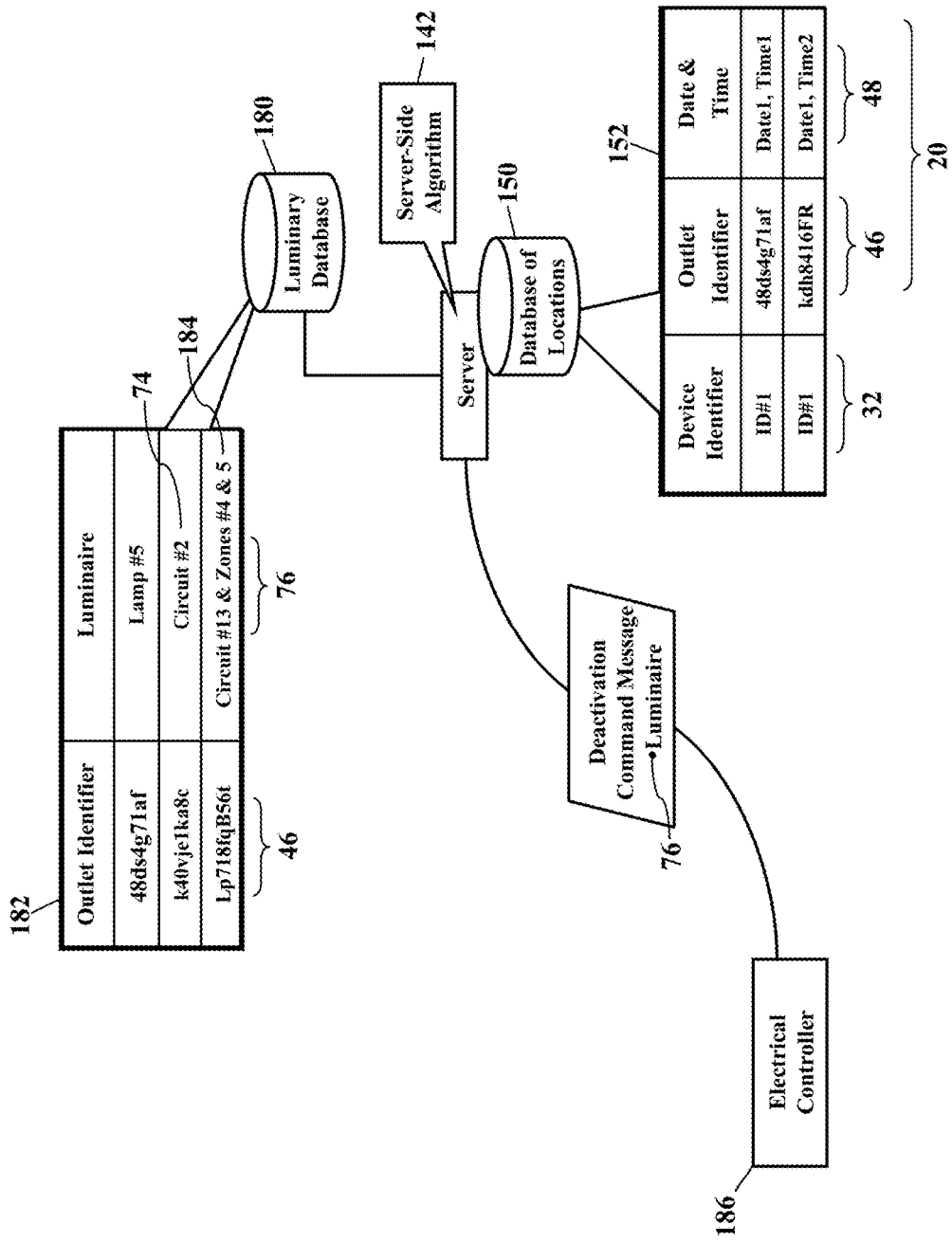

FIG. 17 illustrates deactivation. When the mobile device 22 leaves or exits a room or area, the lights may be deactivated (or "turned off") to conserve electricity. For example, whenever the server 42 logs a new entry in the database 150 of locations, the server-side algorithm 142 may retrieve a previous entry for the same device identifier 32. If one or more consecutive and/or chronological entries have different outlet identifiers 46, then the corresponding mobile device 22 is on the move. The luminary database 180 may thus be queried for the lights and lamps associated with the latest electrical outlet 26. If the current location 20 (represented by the latest time-stamped outlet identifier 46) is associated with a different set of luminaires 76 from a previous entry, then the mobile device 22 has moved to a different room or area. In other words, if the luminaires 76 different from a previous entry associated with the same mobile device 22, the luminaires 76 at one of the previous locations may be deactivated. The server 42 may then send commands or messages to the electrical controller 186 to deactivate the luminaires 76 associated with the previous time-stamped or numerical entry associated with the device identifier 32. As the mobile device 22 has left the room, the lights are deactivated.

Figure 18:
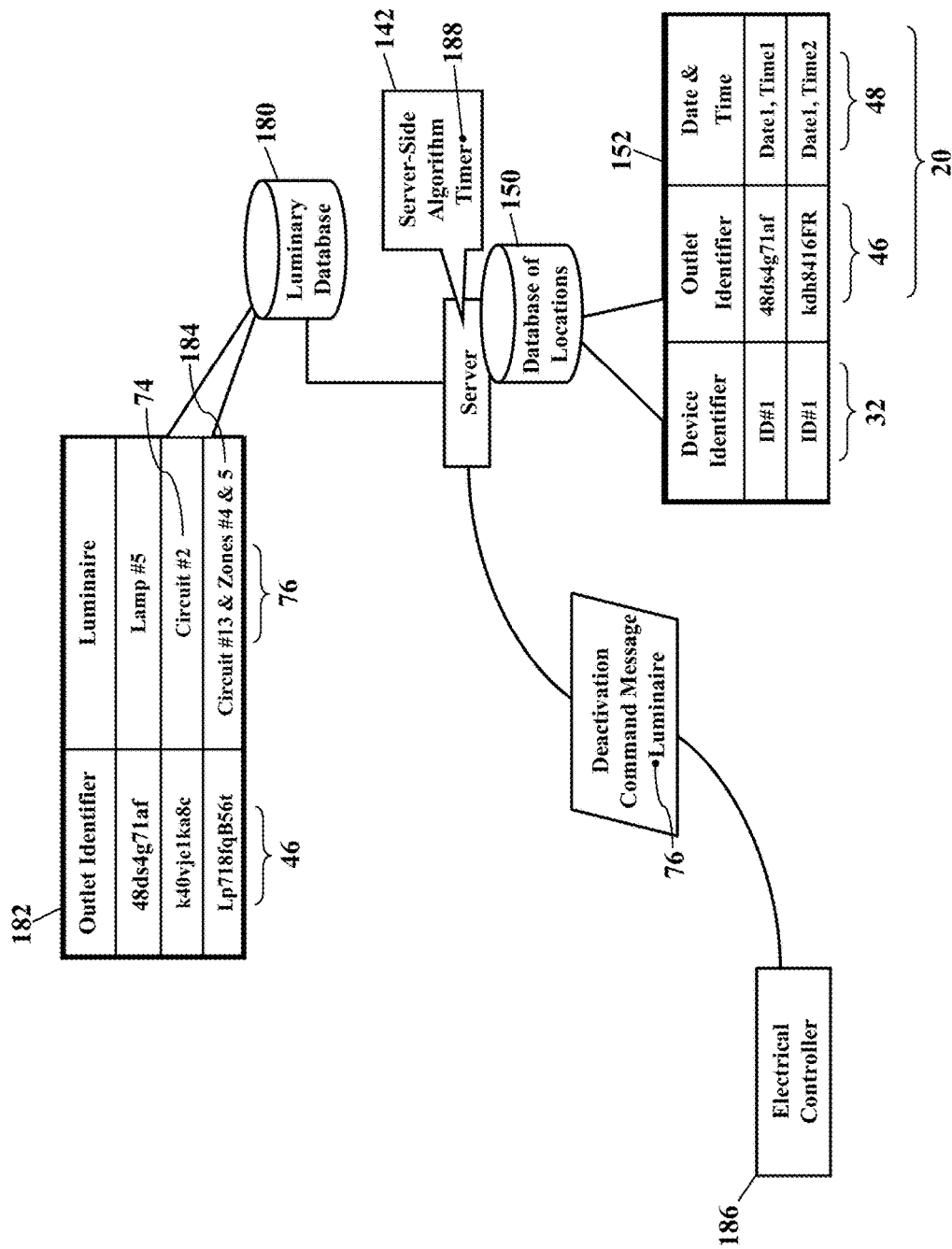

FIG. 18 illustrates timed activation. Even though the mobile device 22 has left the room, there may be instances or situations in which the lights remain "on." For example, multiple people may trail or follow the user, so turning off the lights may leave the stragglers in the dark. Indeed, even if the user's mobile device 22 has left the room, there may still be other people present. Exemplary embodiments, then, may keep the lights activated, despite the movement of the user's mobile device 22. For example, whenever the current location 20 of the mobile device 22 is no longer associated with electrical outlet 26 in the room, the lights may be timed to remain activated. If the mobile device 22 moves to a new electrical outlet 26 associated with different luminaires 76 in the luminary database 180, the server-side algorithm 142 may cause the server 42 to initialize a timer 188 that increments or decrements to a final value. The final value of the timer 188 may thus represent some period of time for which the lights in the room remain activated and on for safety and enjoyment. However, when the timer 188 expires, the server 42 may then deactivate the lights in the room. That is, the server 42 sends the command or message to the electrical controller 186 to deactivate the luminaires 76 in the previous time-stamped or numerical entry associated with the device identifier 32. The timer 188 may thus be configured to suit any period of time for which the luminaires 76 remain activated after the current location 20 has changed.

Figure 19:
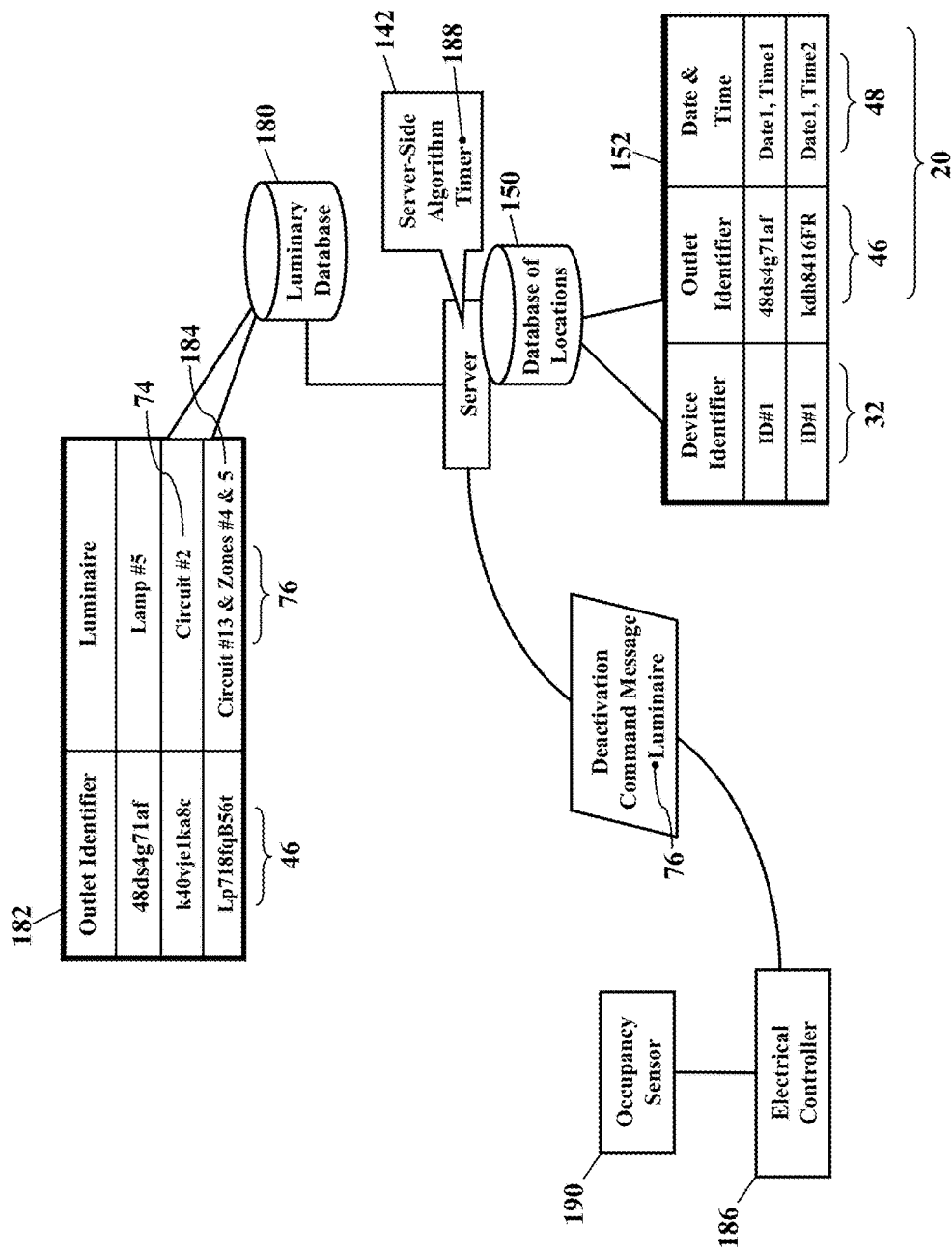

FIG. 19 illustrates occupancy activation. Here the lights in the room remain activated, based on an output from an occupancy sensor 190. Even if the user's mobile device 22 has left the room, there may still be people present in the room. Indeed, the occupancy sensor 190 generates an output signal that indicates presence of people or pets. For example, occupancy sensors are available that use infrared or ultrasonic technology. However, exemplary embodiments may use any technology or device to determine when occupants are present in the room or area. Regardless, exemplary embodiments may deactivate the lights whenever the occupancy sensor 190 no longer detects people in the room. Even if the sever commands the electrical controller 186 to deactivate the corresponding luminaires 76, the electrical controller 186 may have authority to ignore or delay deactivation, based on the output from the occupancy sensor 190.

Figure 20:
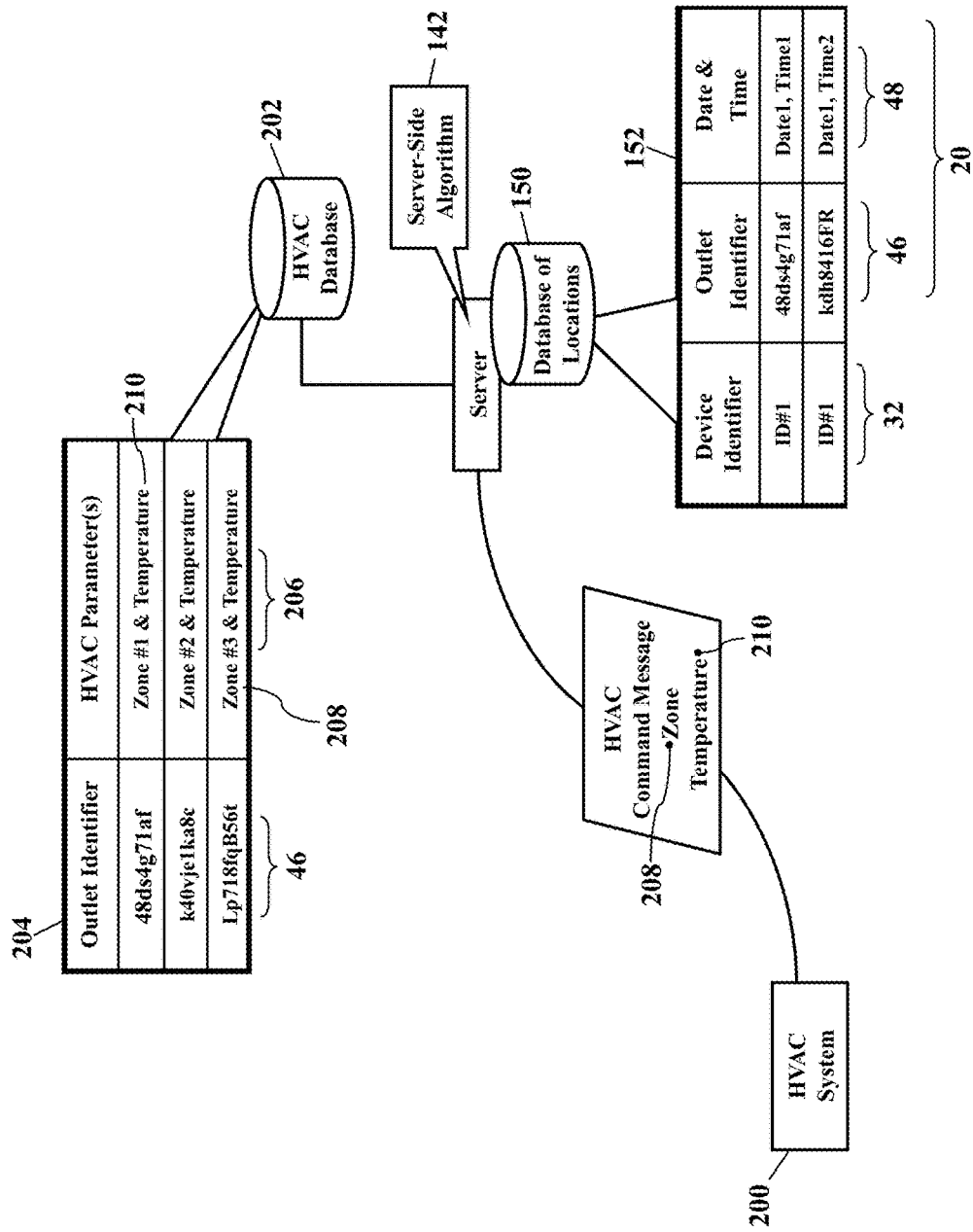
FIG. 20 is a schematic illustrating environmental comfort, according to exemplary embodiments.

FIG. 20 is a schematic illustrating environmental comfort, according to exemplary embodiments. Here a heating, ventilation, and air conditioning ("HVAC") system 200 may heat or cool, based on the current location 20 of the mobile device 22. When the mobile device 22 enters a room or area (as explained above with reference to FIGS. 16-19), the server 42 may send a command or message to the HVAC system 200 to heat or cool the associated room. The server 42, for example, may consult an HVAC database 202. Once the current location 20 of the mobile device 22 is known (as reported by the electrical outlet 26 having the outlet identifier 46), exemplary embodiments may consult the HVAC database 202 for a corresponding HVAC setting. The HVAC database 202 may be locally stored in the server 42 or remotely maintained and queried from any network location or address. Regardless, the HVAC database 202 is illustrated as a table 204 that maps different outlet identifiers 46 to different HVAC parameters 206. For example, once the current location 20 of the mobile device 22 is known (as reported at the corresponding outlet identifier 46), the server 42 may query the HVAC database 202 and retrieve the corresponding zone 208 and temperature setting 210. As those of ordinary skill understand, the HVAC system 200 may heat or cool different zones within the home or building. Some rooms, for example, may have higher temperature settings, depending on the comfort desires of the occupant(s). Some users may want their bedrooms cooled to sixty-eight degrees (68°), but others want their rooms heated to seventy-three degrees (73°). The HVAC system 200 may thus have different zones with different heating or cooling parameters. The HVAC database 202 may thus have different entries that associate the different electrical outlets 26 (as identifier by their corresponding outlet identifiers 46) to their corresponding HVAC zone 208 and temperature setting 210. Once the server 42 retrieves the corresponding HVAC zone 208 and temperature setting 210, the server 42 may then send a command or message to HVAC system 200. The HVAC system 200 thus heats or cools, in response to the current location 20 of the mobile device 22.

Figure 21:
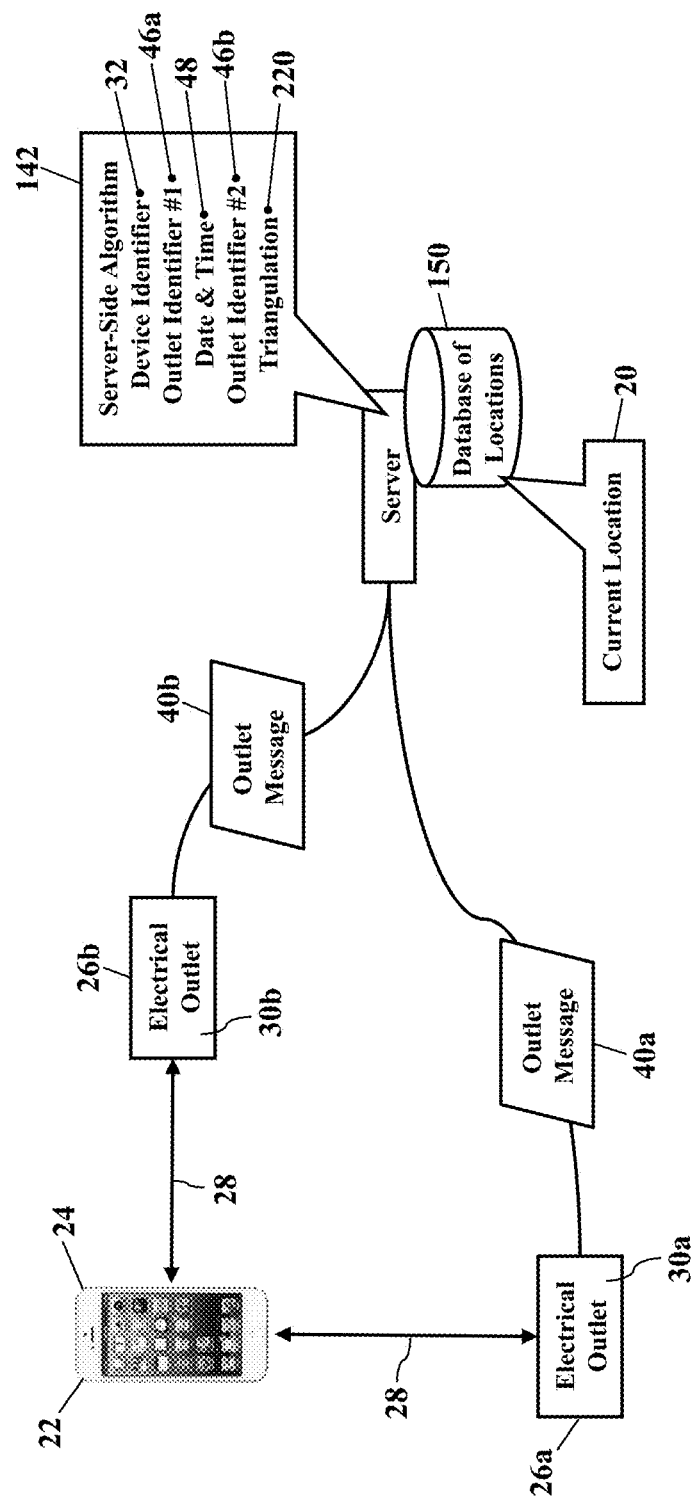
FIG. 21 is a schematic illustrating triangulation, according to exemplary embodiments.

FIG. 21 is a schematic illustrating triangulation 220, according to exemplary embodiments. Here exemplary embodiments may use triangulation 220 to determine a more exact current location 20. As the mobile device 22 moves in some area, the mobile device 22 may wirelessly communicate with multiple ones of the electrical outlets 26. The wireless signal 28, for example, may be received by two (2) or more different electrical outlets (e.g., 26a and 26b) in the same vicinity of the mobile device 22. Again, recall that the NATIONAL ELECTRICAL CODE® specifies a maximum spacing for the electrical outlets along any wall. There may be times, then, when the wireless signal 28 is simultaneously, or nearly simultaneously, received by multiple electrical outlets 26a and 26b. When each respective transmitter 30a and 30b receives the wireless signal 28, the triangulation 220 may be used to determine a more exact current location 20 of the mobile device 22. Wireless triangulation may determine a signal strength of the wireless signal 28 received by each respective transmitter 30a and 30b. Wireless triangulation, however, is well known and need not be discussed in detail. The server 42 may then use the current location 20, as this disclosure explains.

Figure 22:
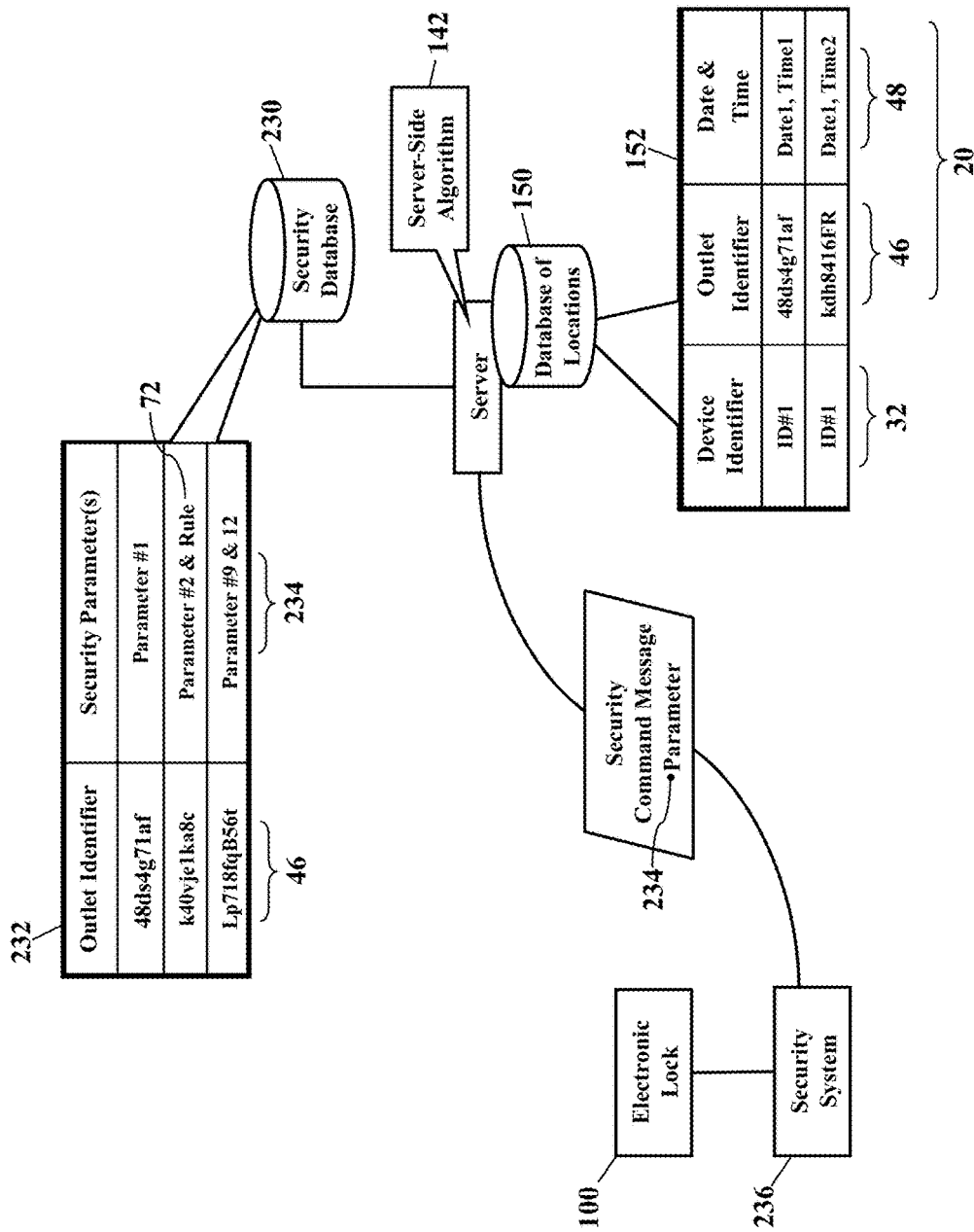
FIG. 22 is a schematic illustrating security control, according to exemplary embodiments.

FIG. 22 is a schematic illustrating security control, according to exemplary embodiments. Here exemplary embodiments may activate and deactivate security measures, based on the current location 20 of the mobile device 22. Once the current location 20 of the mobile device 22 is known (as this disclosure explains), the server 42 may consult a security database 230. The security database 230 stores one or more security measures related to the current location 20. The security database 230 may be locally stored in the server 42 or remotely maintained and queried from any network location or address. Regardless, the security database 230 is illustrated as a table 232 that maps different outlet identifiers 46 to different security parameters 234. For example, once the current location 20 of the mobile device 22 is known (as reported at the corresponding outlet identifier 46), the server 42 may query the security database 230 and retrieve the corresponding security parameters 234. For example, if sequential entries in the database 150 of locations indicate the mobile device 22 is moving outside to inside, the server 42 may query the security database 230 and retrieve the rule 72 that deactivates an alarm system 236 and automatically deactivates the electronic lock 100, based on proximity to the electrical outlets near an entry door. Rules may be further defined by time, such that exterior and/or interior lights are activated or deactivated based on a matching comparison of date and time.

Figure 23:
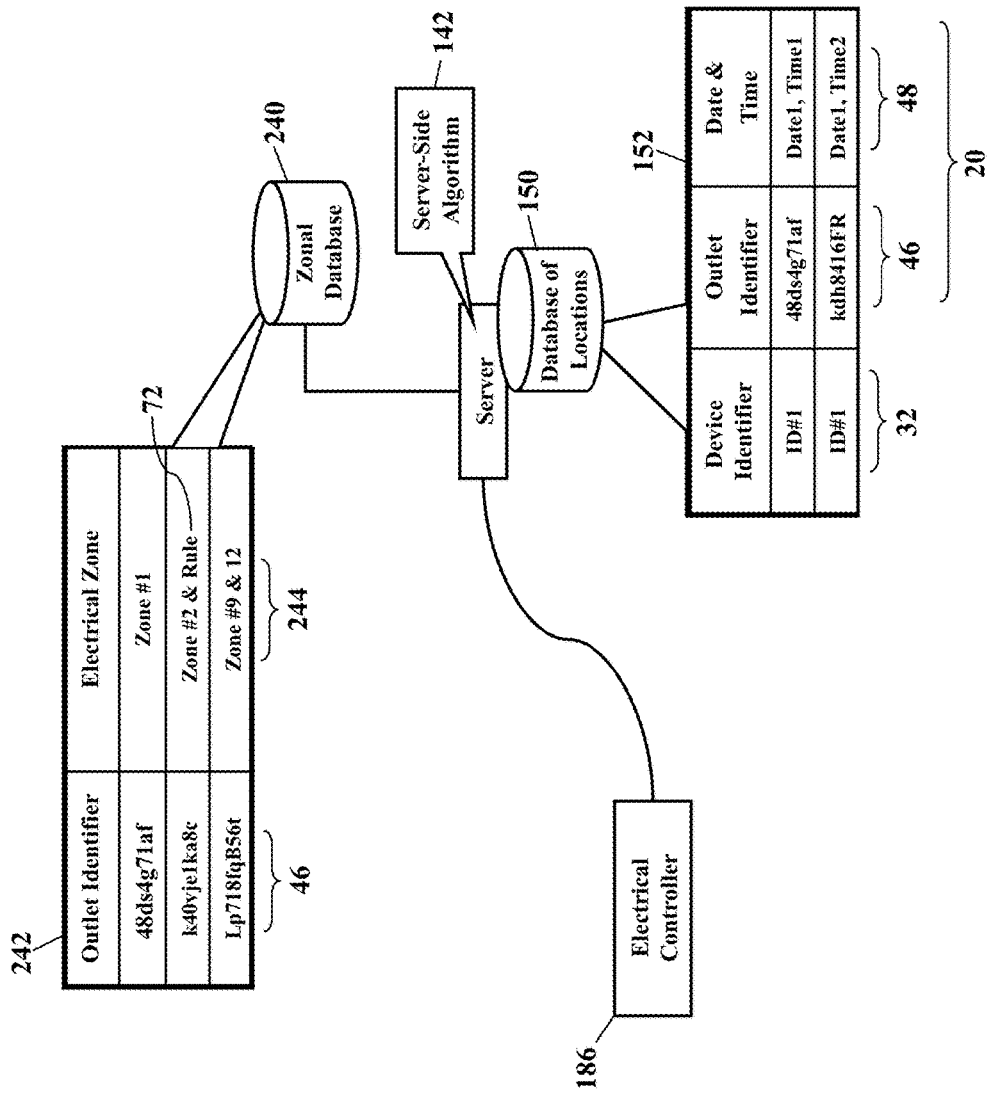
FIG. 23 is a schematic illustrating appliance control, according to exemplary embodiments.

FIG. 23 is a schematic illustrating appliance control, according to exemplary embodiments. Here exemplary embodiments may activate, or deactivate, electrical appliances, based on the current location 20 of the user's mobile device 22. For example, different electrical zones may be defined for different circuits powering entertainment systems, appliances, and other electrical loads. Once the current location 20 of the mobile device 22 is known (as this disclosure explains), the server 42 may consult a zonal database 240. The zonal database 240 stores one or more electrical loads related to the current location 20. The zonal database 240 may be locally stored in the server 42 or remotely maintained and queried from any network location or address. Regardless, the zonal database 240 is illustrated as a table 242 that maps different outlet identifiers 46 to different electrical zones 244. For example, each different electrical zone 244 may power a single appliance or an entire electrical circuit. As the user's mobile device 22 establishes communication with the electrical outlet 26 (identified by the corresponding outlet identifier 46), the server 42 may consult the zonal database 240 to retrieve the corresponding zone 244. Each electrical zone 244 may even be defined by the rule 72, such that a television is only activated during evening hours and a coffee brewer is only activated during morning hours. Exemplary embodiments may thus activate or deactivate any electrical load, based on the current location 20 of the user's mobile device 22.

Figure 24:
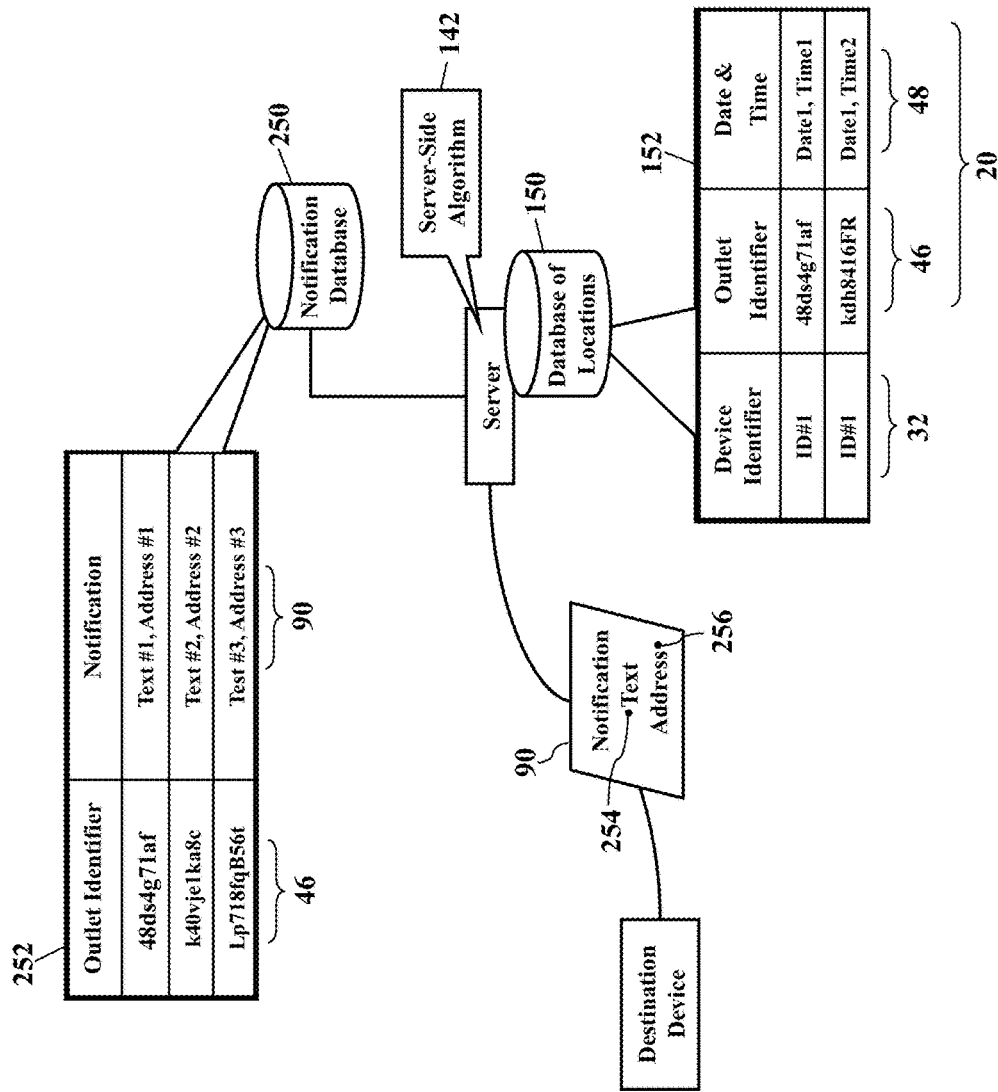
FIG. 24 is a schematic illustrating locational notifications, according to exemplary embodiments.

FIG. 24 is a schematic illustrating locational notifications, according to exemplary embodiments. Here exemplary embodiments may send or authorize the notification 90, based on the current location 20 of the user's mobile device 22. A notification database 250, for example, stores different notifications 90 associated with different outlet identifiers 46. Once the current location 20 of the mobile device 22 is known (as this disclosure explains), the server 42 may consult the notification database 250 and retrieve the corresponding notification 90. The notification database 250 may be locally stored in the server 42 or remotely maintained and queried from any network location or address. Regardless, the notification database 250 is illustrated as a table 252 that maps different outlet identifiers 46 to different text 254 and destination addresses 256. The notification database 250 may thus store different messages that are sent, based on the current location 20 in relation to the electrical outlets 26 in the home or business. Each notification may thus be uniquely tailored to very specific locations. For example, suppose a baby child wears a mobile monitor as the mobile device 22. If the baby approaches an electrical outlet 26 located near a stairwell, exemplary embodiments may alert to a potential injurious fall. A parent may thus rush to the stairwell and preempt injury. Other notifications 90 may simply report whereabouts of a particular person's mobile device 22, such as "John is currently located in his room" or "Mary's device is in the laundry room." The notification 90 may be sent as an SMS or email message for nearly immediate receipt. However, an entry may even specify a web site or network address from which a file is retrieved and sent to the destination address 256. The notification 90 is sent by the server 42 to alert the destination device or user of the current location 20 of the mobile device 22.

Figure 25:
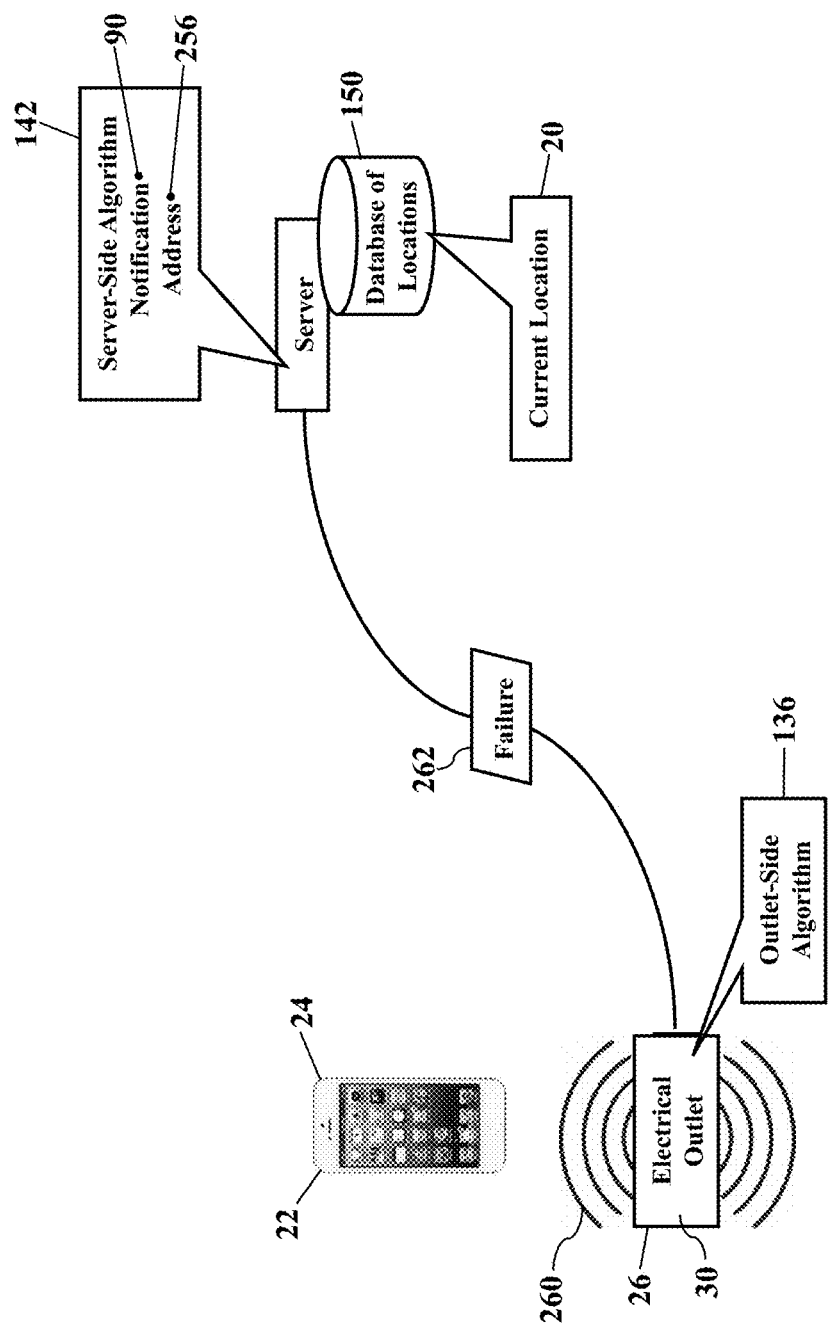
FIG. 25 is a schematic illustrating locational confirmation, according to exemplary embodiments.

FIG. 25 is a schematic illustrating locational confirmation, according to exemplary embodiments. Here exemplary embodiments may confirm the current location 20 of the mobile device 22. Once the current location 20 of the mobile device 22 is determined (as this disclosure explains), the server 42 may instruct the transceiver 30 to periodically or randomly ping the mobile device 22 to confirm the current location 20. That is, the transceiver 30 is instructed to broadcast an interrogation signal 260, perhaps after some time has elapsed. For example, if the mobile device 22 fails to report its current location 20 (by sending the wireless signal 28 explained with reference to FIGS. 1-8) within expiration of some period of time, the transceiver 30 may be instructed to send the interrogation signal 260. If the mobile device 22 fails to respond (perhaps by again sending the wireless signal 28 illustrated in FIGS. 1-8), then the electrical outlet 26 may return send a failure message 262 to the server 42. The server-side algorithm 142 may thus infer or assume a problem exists. For example, if the battery in the mobile device 22 lacks sufficient charge or power, the mobile device 22 may have lost its ability to send and receive signals, thus failing to report its location. Exemplary embodiments may then send the notification 90 to any destination address 256, alerting of the loss of communication and identifying the last reported location 20.

Figure 26:
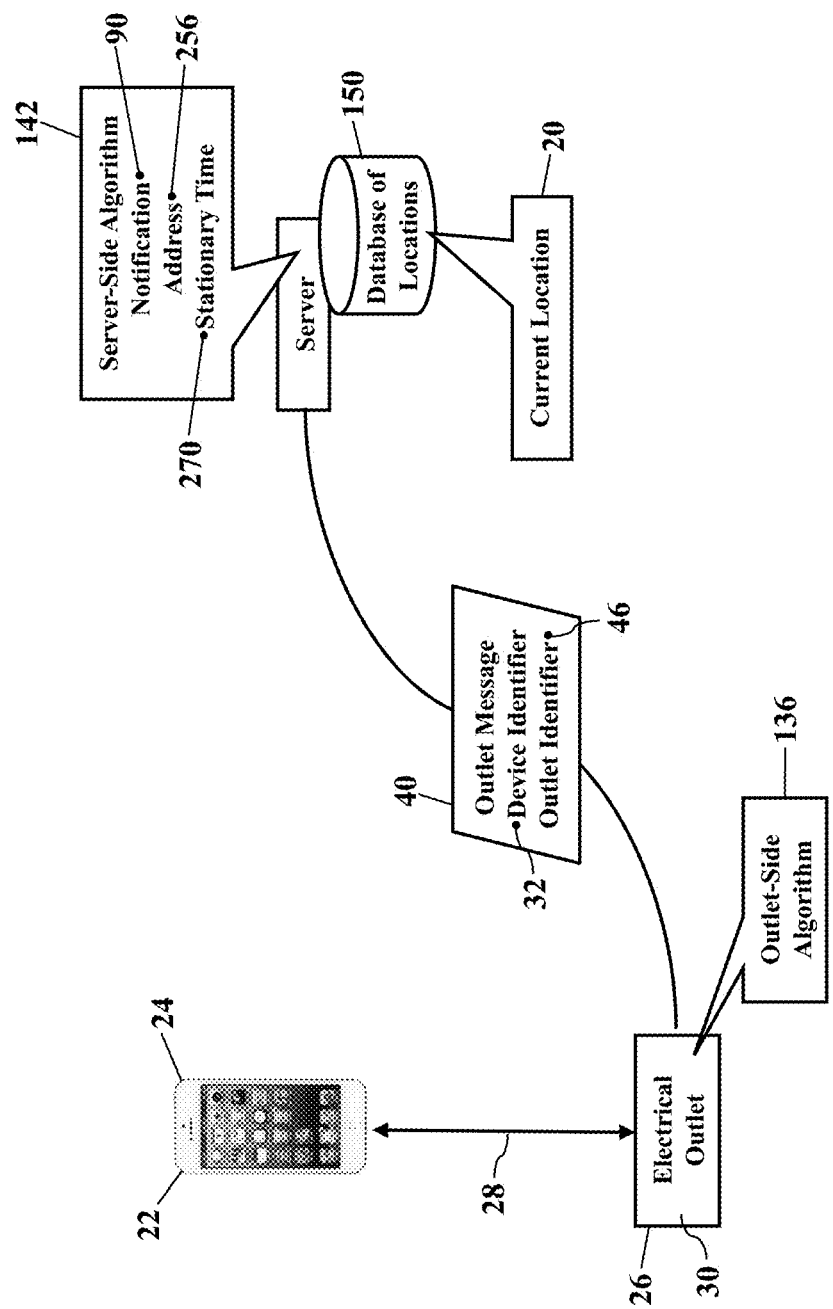
FIG. 26 is a schematic illustrating health and safety notifications, according to exemplary embodiments.

FIG. 26 is a schematic illustrating health and safety notifications, according to exemplary embodiments. Here exemplary embodiments may alert emergency personnel when health and safety conditions are determined. For example, if the current location 20 of the mobile device 22 remains abnormally stationary, the user may be experiencing a health emergency. Consider, for example, an elderly or infirm user of the mobile device 22. As the mobile device 22 repeatedly reports its current location 20, consecutive or sequential time-stamped entries may indicate that the mobile device 22 has remained stationary at the same electrical outlet 26 for some impermissible stationary period 270 of time. Indeed, the triangulation (explained with reference to numeral 220 in FIG. 21) may reveal that the mobile device 22 is near a floor or wall, indicating the user may have fallen. The server-side algorithm 142 may thus infer or assume an emergency condition exists and send the emergency notification 90 to the destination address 256. The server 42, for example, may call, text, and/or email emergency personnel and loved ones and report the emergency condition. Exemplary embodiments, however, may exclude stationary reports during preprogrammed or configured sleeping hours, eating hours, battery charging hours, and other defined time periods of known stationary conditions.

Figure 27:
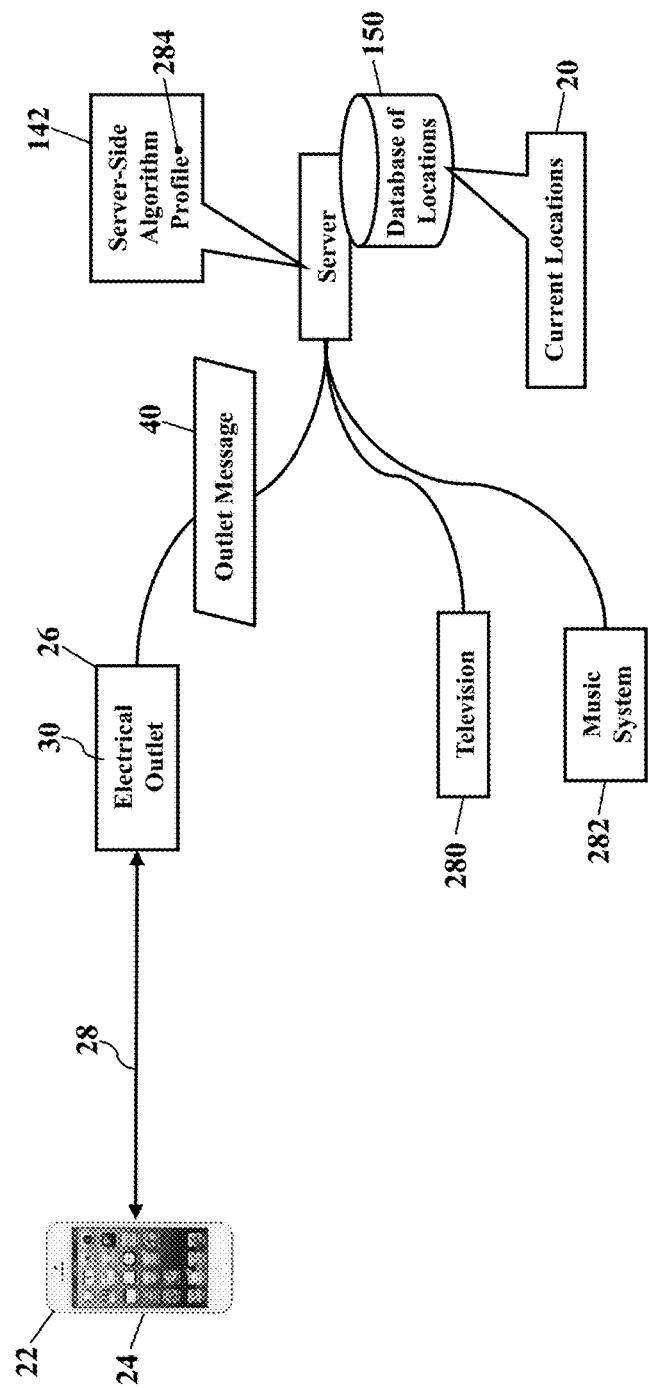
FIGS. 27-28 are schematics illustrating content control, according to exemplary embodiments.
Figure 28:
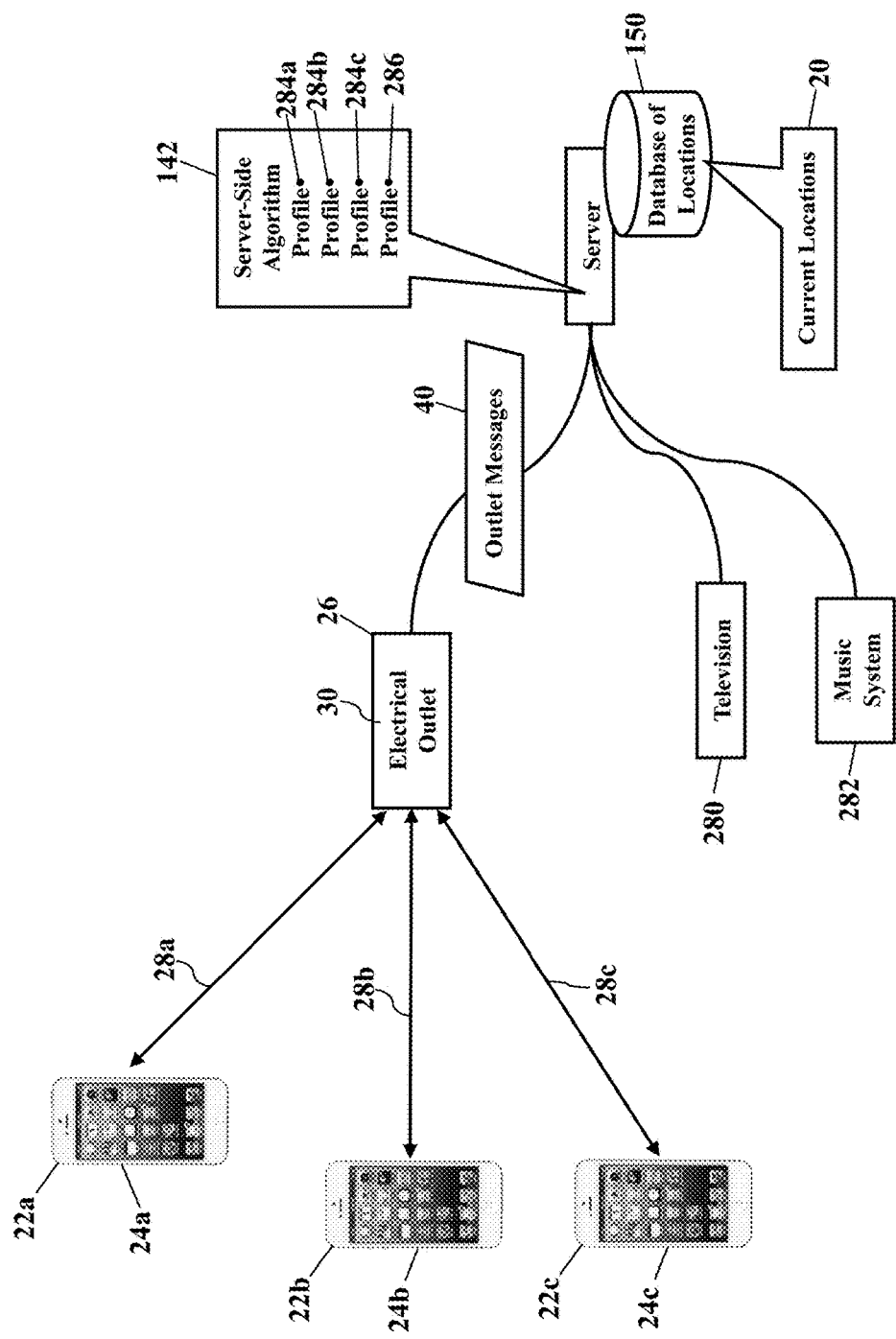

FIGS. 27-28 are schematics illustrating content control, according to exemplary embodiments. Here exemplary embodiments may select content for presentation, based on the mobile devices 22 in a room. FIG. 27, for example, illustrates a single mobile device 22 that establishes communication with the electrical outlet 26, as this disclosure explains. The server 42 may thus activate a television 280, music system 282, or other entertainment component, based on the current location 20 of the mobile device 22 (also as this disclosure explains). The server 42 may retrieve a profile 284 associated with the device identifier 32 of the mobile device 22 and automatically select the programming and/or music, based on the content preferences in the profile 284. Content may thus be displayed or played to suit the user's desires or favorites, based on her content profile 284.

FIG. 28 illustrates composite profiling. As the reader may realize, there will be times when multiple mobile devices 22 have the same or approximate colocation. For example, when family and friends gather in the same room, exemplary embodiments will detect the presence of each individual's mobile device 22 via the electrical outlets 26, as this disclosure explains. FIG. 28 illustrates the electrical outlet 26 receiving the wireless signals 28a, 28b, and 28c from respective mobile devices 22a, 22b, and 22c. When the server 42 determines their respective current locations 20, the server 42 may also retrieve multiple content profiles 284a, 284b, and 284c. Exemplary embodiments may thus generate a composite profile 286, based on the requirements and/or preferences in each individual content profile 284a, 284b, and 284c. For example, if content profile 284b is associated with a minor child, the server 42 may exclude "R"-rated programming. All the content profiles 284a, 284b, and 284c may dislike reality shows, which the server 42 may again exclude. The server 42 may continue evaluating the content profiles 284a, 284b, and 284c and comparing to content offerings to generate one or more content suggestions. The server 42 may then automatically select the programming and/or music, based on the composite profile 286. Content may thus be displayed or played to suit the user's desires or favorites, based a blending of the multiple content profiles 284a, 284b, and 284c. As profiling of mobile devices is generally known, the known details need not be explained.

Exemplary embodiments may thus present age-appropriate content. Should a minor child enter a room full of adults, the server 42 may immediately pause an "R"-rated movie, based on the current location 20 of the minor's mobile device 22. The server 42 may even switch to a "PG"-rated program, to avoid exposing the minor child to inappropriate sexual scenes or profane language. Application programming interfaces (or "APIs") may be developed, thus allowing software developers to call and use the locational services described herein.

Figure 29:
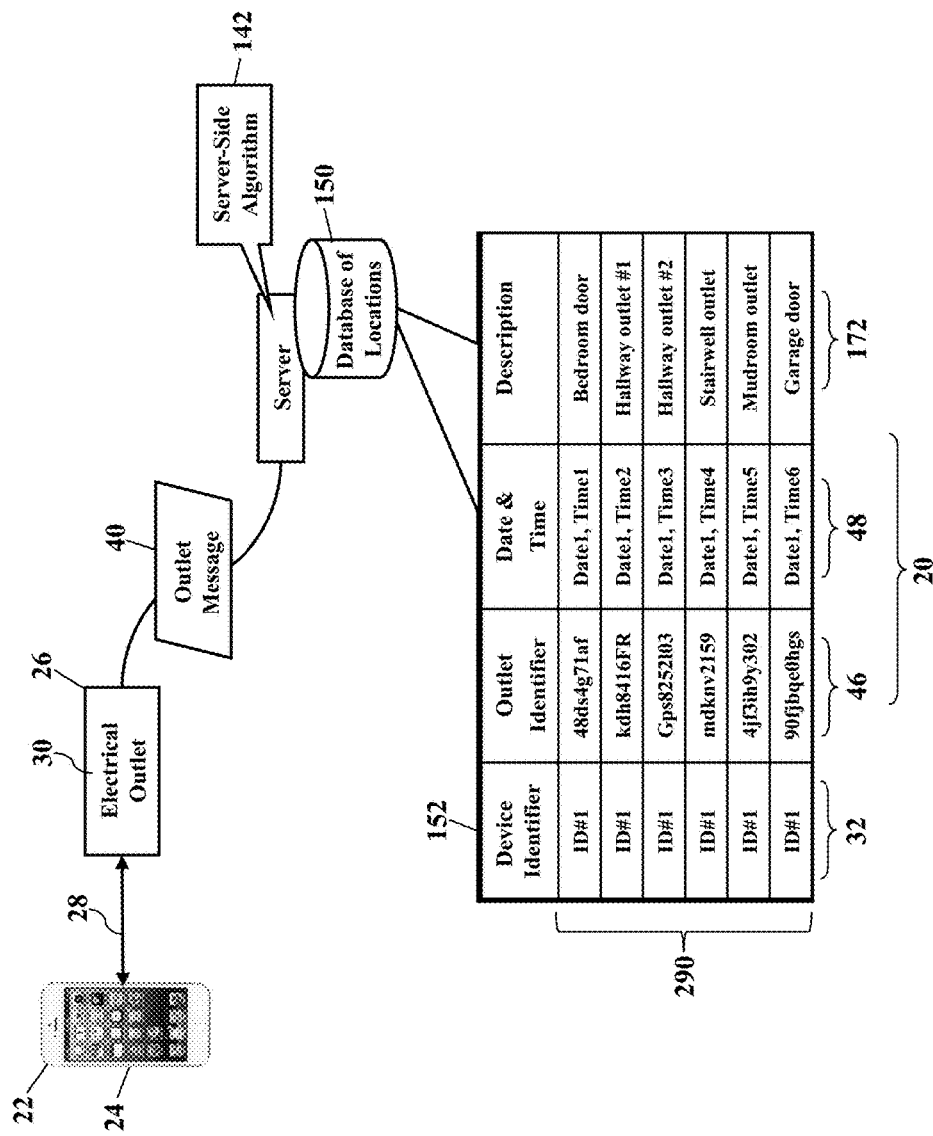
FIG. 29 is a schematic illustrating pattern recognition, according to exemplary embodiments.

FIG. 29 is a schematic illustrating pattern recognition, according to exemplary embodiments. Here the movements of the mobile device 22 may be tracked and compared to historical patterns. The database 150 of locations, as this disclosure explains, will in time log a rich history of the movements of the user's mobile device 22. Exemplary embodiments may thus recognize habitual patterns and compare and match to current movements, thus predicting future movements. For example, the server-side algorithm 142 may analyze consecutive or sequential entries in the database 150 of locations and store repeated routes. FIG. 29, for example, illustrates a chronological sequence 290 of outlet identifiers 46 and their corresponding textual descriptions 172. Suppose this locational sequence 290 represents the route the user walks from a bedroom to a garage. Over time this same locational sequence 290 will be logged many times in the database 150 of locations, as the user's mobile device 22 repeatedly traverses the same route from the bedroom to the garage. The server-side algorithm 142 may thus compare any current sequence of entries to the historical entries in the database 150 of locations. If a match is determined, the server-side algorithm 142 may infer that the mobile device 22 will pass by the upcoming or next electrical outlet(s) on the same sequence 290. The server-side algorithm 142, in other words, may predict the next electrical outlet 26 in the same sequence 290 as a future location. Indeed, the server-side algorithm 142 may also determine the speed or rate of movement from the difference in time stamps 48 and a known distance or spacing between successive electrical outlets. The server-side algorithm 142 may thus also predict the future time 48 at which the mobile device 22 will pass by the next electrical outlet 26 in the same sequence 290.

Locational prediction will be very useful. Reconsider the common situation when the minor child approaches the room full of adults. Here the server 42 may predict, in advance, when the child will enter the room, based on some habitual pattern of movement. The server 42 may thus pause or switch the "R"-rated movie, prior to the child's arrival in the room. Indeed, the server 42 may even generate and cause display of a graphical, visual notification announcing the child's arrival, based on the route prediction. In other situations the server 42 may activate lights and appliances, based on the habitual patterns or routes recognized in the database 150 of locations. Exemplary embodiments may thus learn routines and execute programmed responses based on historical movements and/or schedules.

Figure 30:
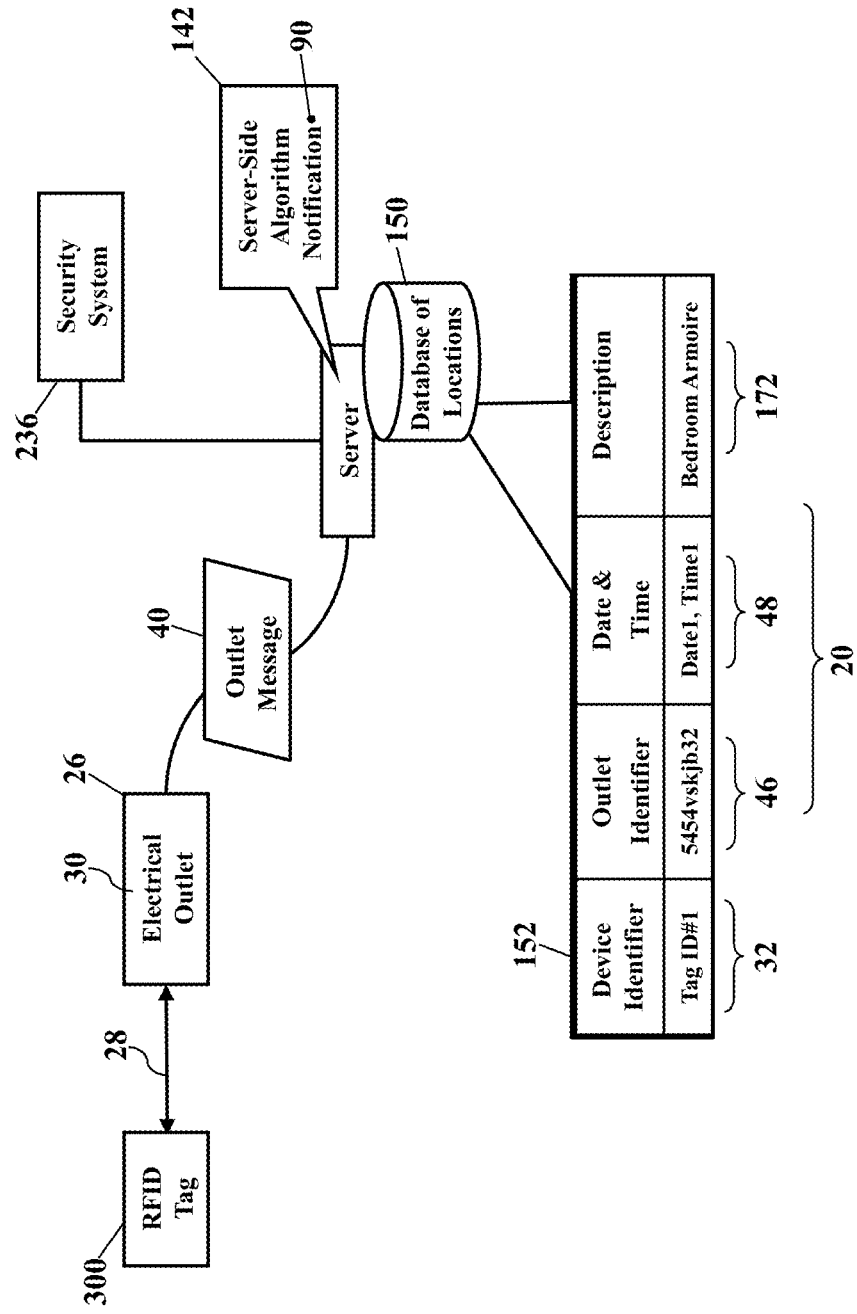
FIG. 30 is a schematic illustrating theft prevention, according to exemplary embodiments.
Figure 31:
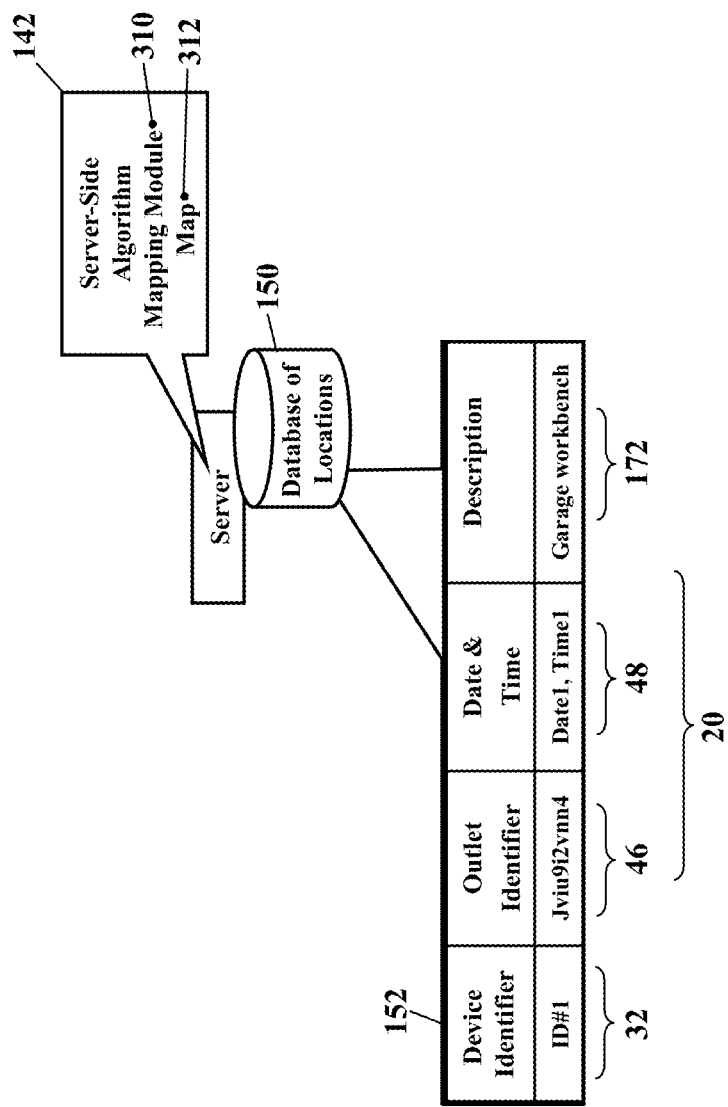
FIGS. 31-35 are schematics illustrating mapping features, according to exemplary embodiments.

FIG. 30 is a schematic illustrating theft prevention, according to exemplary embodiments. Here the mobile device 22 is a radio-frequency identification (or "RFID") tag 300 added to some sentimental or valuable item (such as a watch, ring, or collectable). The RFID tag 300 responds to signals transmitted from the transceiver 30 in the electrical outlet 26. Radio frequency identification is well known, so the details need not be explained. Here, though, the electrical outlet 26 sends the outlet message 40 in response to wireless communication with the passing RFID tag 300. The server 42, in other words, logs the current location 20 of the RFID tag 300 in the database 150 of locations, based on the unique device identifier 32 of the RFID tag 300. The database 150 of locations thus tracks the historical whereabouts of our precious possessions, based on detection of the RFID tag 300. Exemplary embodiments may thus execute rules, based on the reported current location 20 of the RFID tag 300. For example, should the RFID tag 300 be observed moving toward an electrical outlet 26 near a door or window, the server 42 may activate the security system 236, send the notification 90, and even call police. Indeed, any time a valuable item moves from a defined electrical outlet 26, exemplary embodiments may alert.

Figure 32:
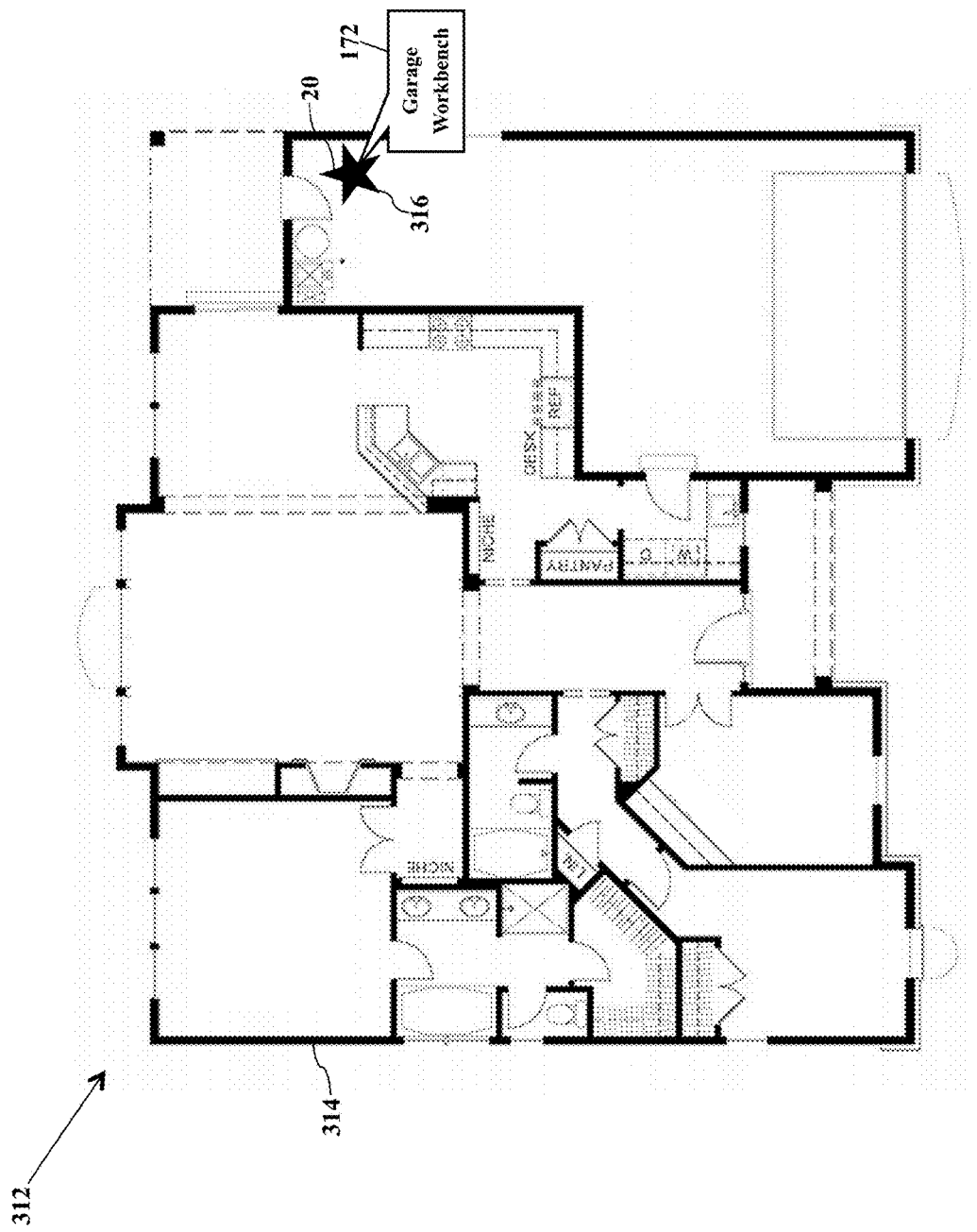

FIGS. 31-35 are schematics illustrating mapping features, according to exemplary embodiments. Here exemplary embodiments may generate and display maps of the current location 20. The server-side algorithm 142, for example, may have a mapping module 310 that generates a graphical map 312. The server-side algorithm 142 may query the database 150 of locations for any device identifier 32 and retrieve its corresponding current location 20. The server-side algorithm 142 may then generate the graphical map 312, as FIG. 32 illustrates. The graphical map 312 is illustrated as a floor plan 314, thus making the visual presentation match the physical and structure features of the home or business. The current location 20 is conspicuously indicated an obvious icon 316. The server-side algorithm 142 may even retrieve the textual description 172 ("Garage Workbench") of the corresponding outlet, thus simplifying the current location 20 with meaningful content.

Figure 33:
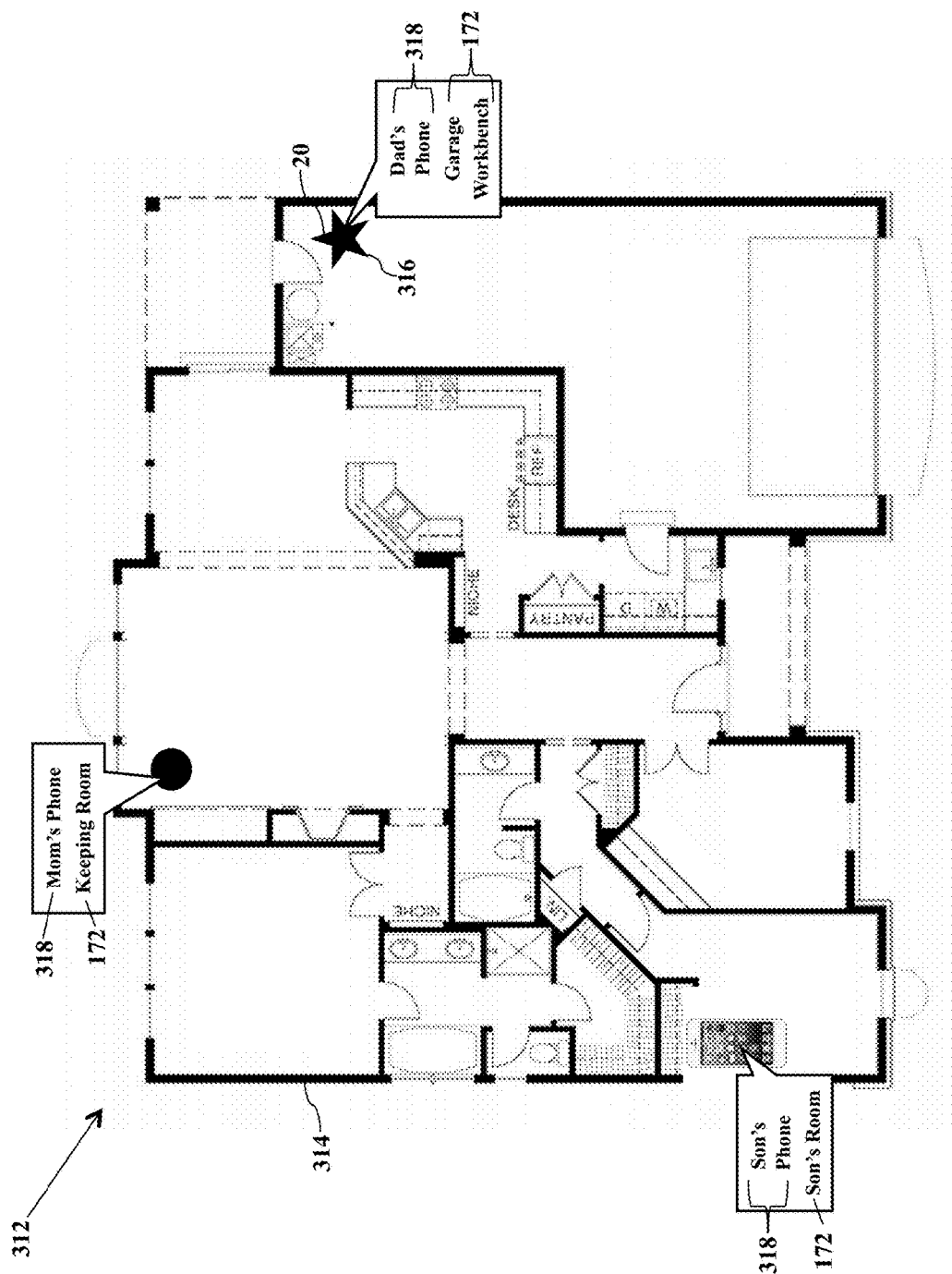

FIG. 33 illustrates mapping of multiple mobile devices 22. Exemplary embodiments may determine the current locations 20 of any mobile devices 22, as this disclosure explains. The server-side algorithm 142 may thus generate the map 312 to provide a comprehensive view of the current locations 20 of many mobile devices 22 in the home or business. The different textual descriptions 172 may also be included, thus allowing quick identification of the different mobile devices 22 and their respective locations 20. Each different mobile device 22 may its own obvious icon 316, this again visual differentiating the different locations. Each different mobile device 22 may even be associated with its own different icon 216 and moniker 318, further improving the visual presentation of the map 312.

Figure 34:
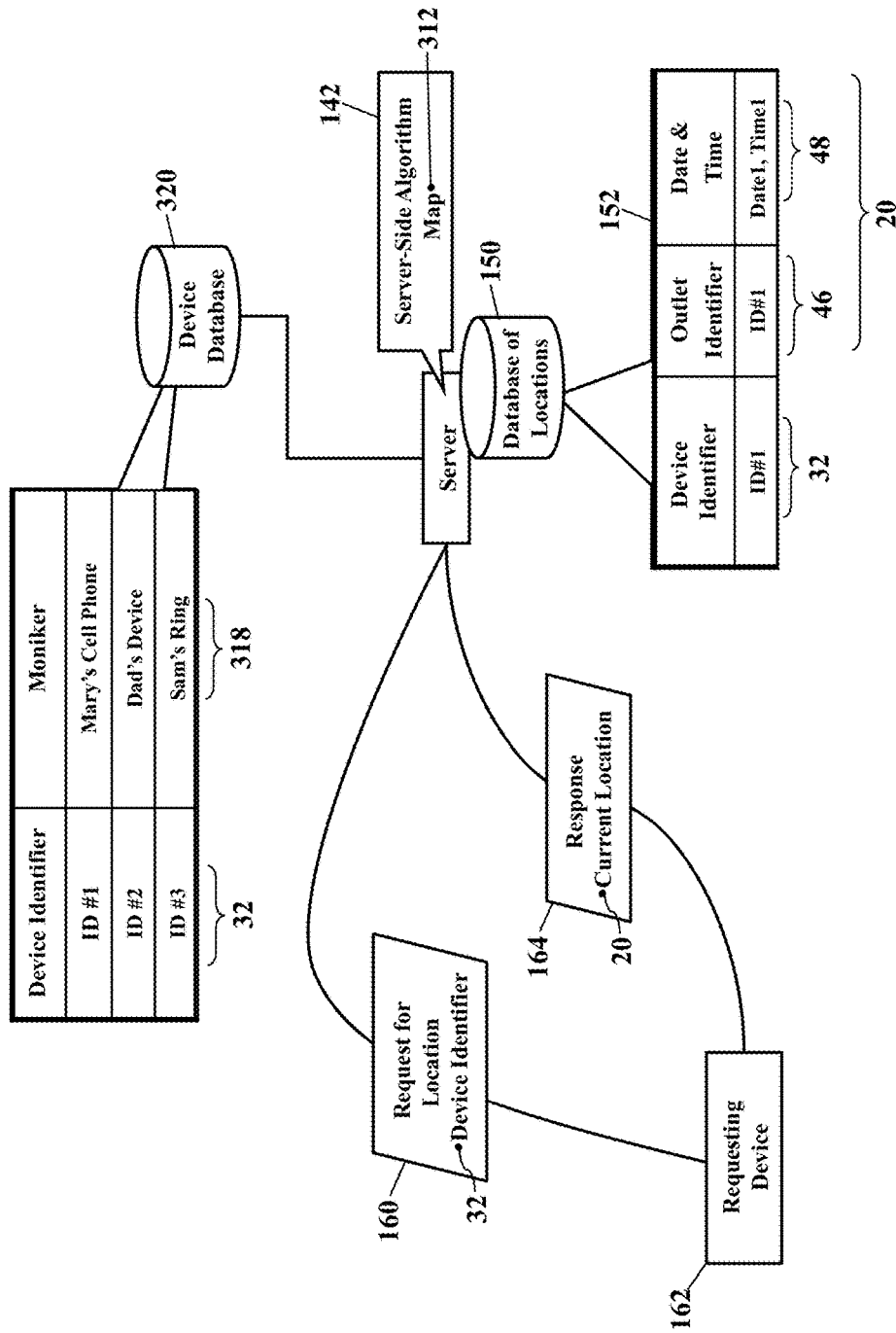
Figure 35:
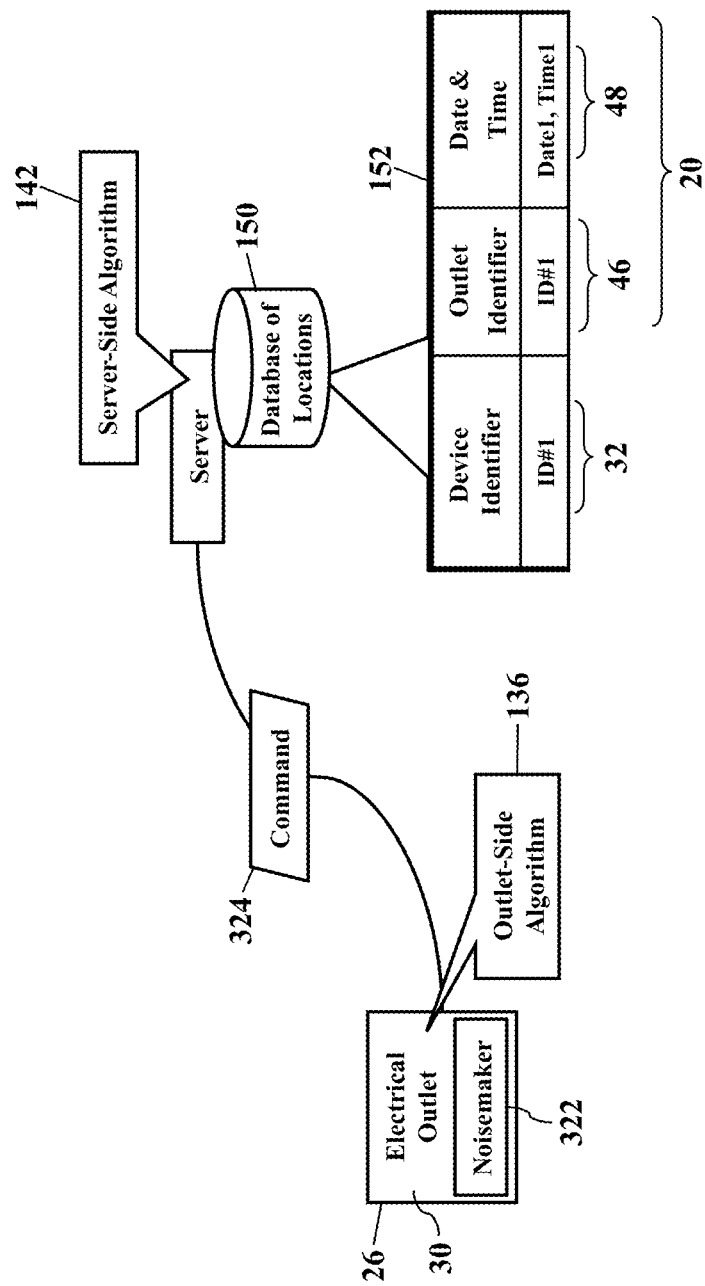

FIGS. 34-35 illustrate lost and found features. As this disclosure explains, exemplary embodiments may be used to reveal the current location 20 of the mobile device 22. The user, for example, need only submit the request 160 for location that queries the database 150 of locations. The request 160 for location may include the device identifier 32 as the query parameter. However, most people do not know the unique alphanumeric device identifier 32 assigned to their mobile device 22. The user, then, may query for the moniker 318 that describes the mobile device 22 in plain words (such as "Mary's cell phone" or "Sam's ring"). The server-side algorithm 142 may then perform a reverse lookup using a device database 320, which maps different device identifiers 32 to their corresponding device monikers 318. The server-side algorithm 142 may thus compare and match the user's plainly worded device moniker 318 to the corresponding device identifier 32. Once the device identifier 32 is known, the server 42 may then query the database 150 of locations for the current location 20, as this disclosure explains. The server-side algorithm 142 may then generate the graphical map 312 to visually indicate the current location 20 (as illustrated with reference to FIGS. 32-33). Moreover, as FIG. 35 illustrates, the corresponding electrical outlet 26 may be commanded to activate a noisemaker 322, thus further indicating the current location 20 of the user's mobile device 22. The server 42, for example, may send a command message 324 to the network address associated with the electrical outlet(s) 26 at or near the current location 20. The processor 134 in the electrical outlet 26 is thus instructed to activate noisemaker 322 that outputs some audible signal. The electrical outlet 26, for example, may chirp or sing to alert of the current location 20 of the user's mobile device 22.

Figure 36:
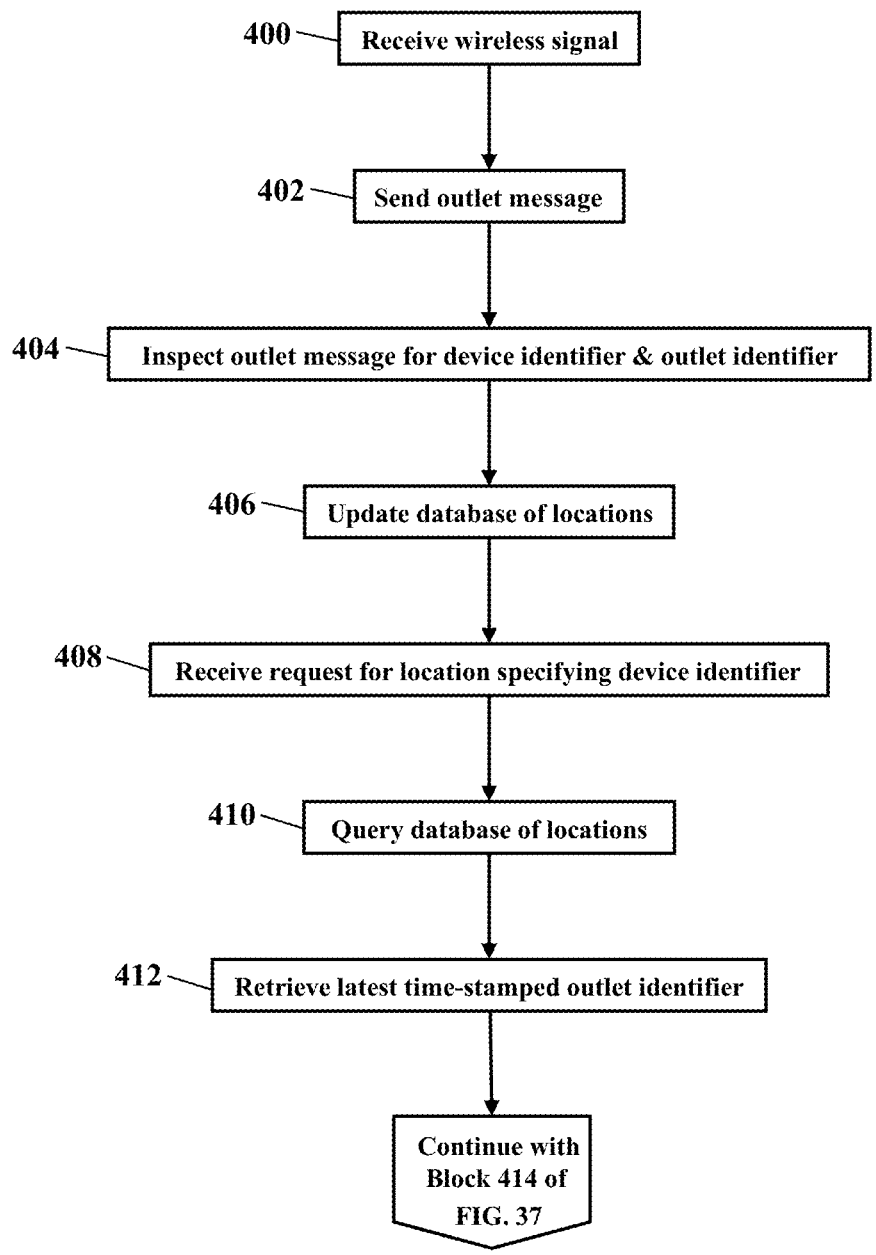
FIGS. 36-37 are flowcharts illustrating a method or algorithm for locational determination, according to exemplary embodiments.
Figure 37:
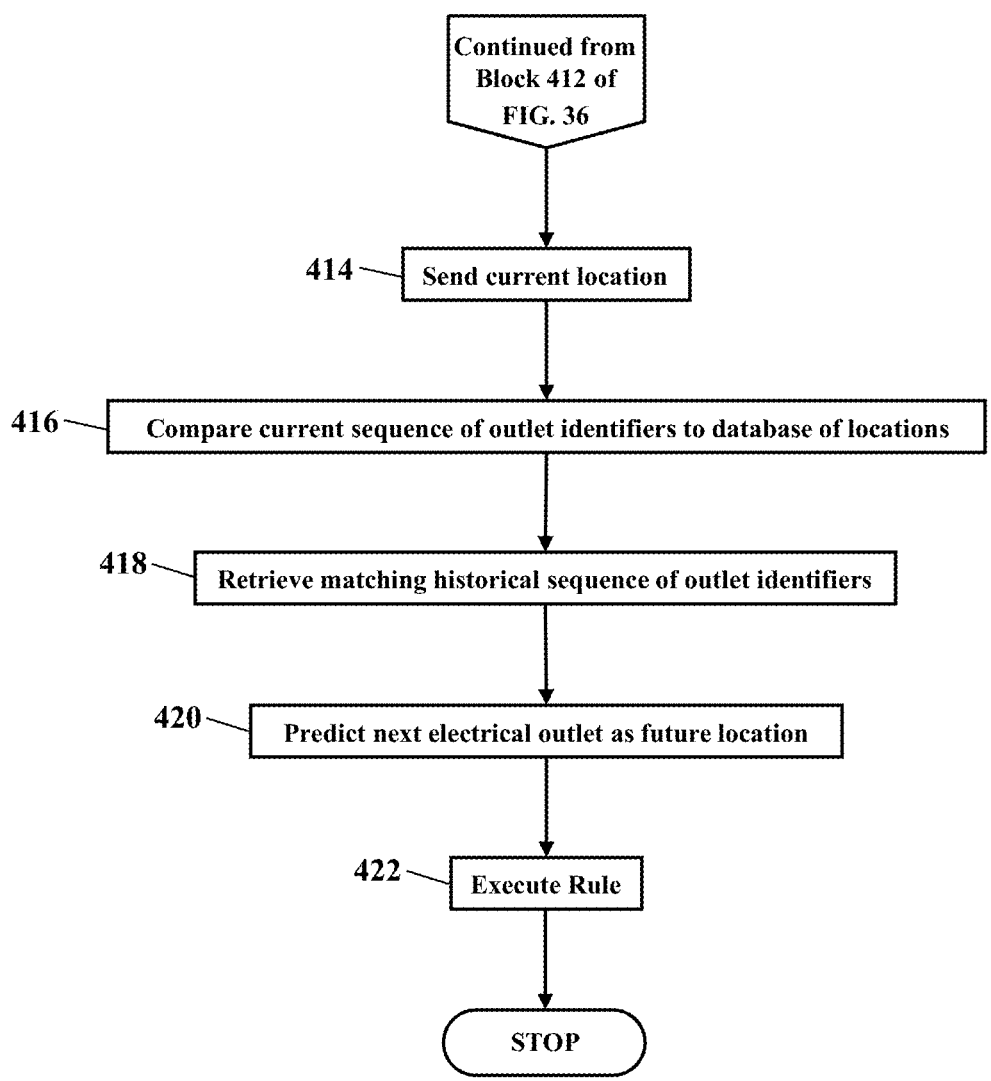

FIGS. 36-37 are flowcharts illustrating a method or algorithm for locational determination, according to exemplary embodiments. The wireless signal 28 is received from the mobile device 22 (Block 400). The outlet message 40 is sent (Block 402). The outlet message 40 is inspected for the device identifier 32 and for the outlet identifier 46 (Block 404). The database 150 of locations is updated with an entry for the current time, the device identifier 32, and the outlet identifier 46 (Block 406). A request for location is received requesting the current location 20 of the mobile device 22 associated with the device identifier 32 (Block 408). The database 150 of locations is queried for the device identifier 32 (Block 410), and the latest time-stamped outlet identifier 46 is retrieved (Block 412).

The flowchart continues with FIG. 37. Once the latest time-stamped outlet identifier 46 is determined, the current location 20 is sent in response (Block 414). A current sequence of the outlet identifiers 46 is compared to the database 150 of locations (Block 416) and a matching historical sequence of the outlet identifiers 46 is retrieved (Block 418). A next electrical outlet 26 is predicted as a future location (Block 420) based on the matching historical sequence. A rule is executed (Block 422) based on the current location 20 and/or the predicted future location. The steps shown in the flowcharts may be performed in any sequence.

Figure 38:
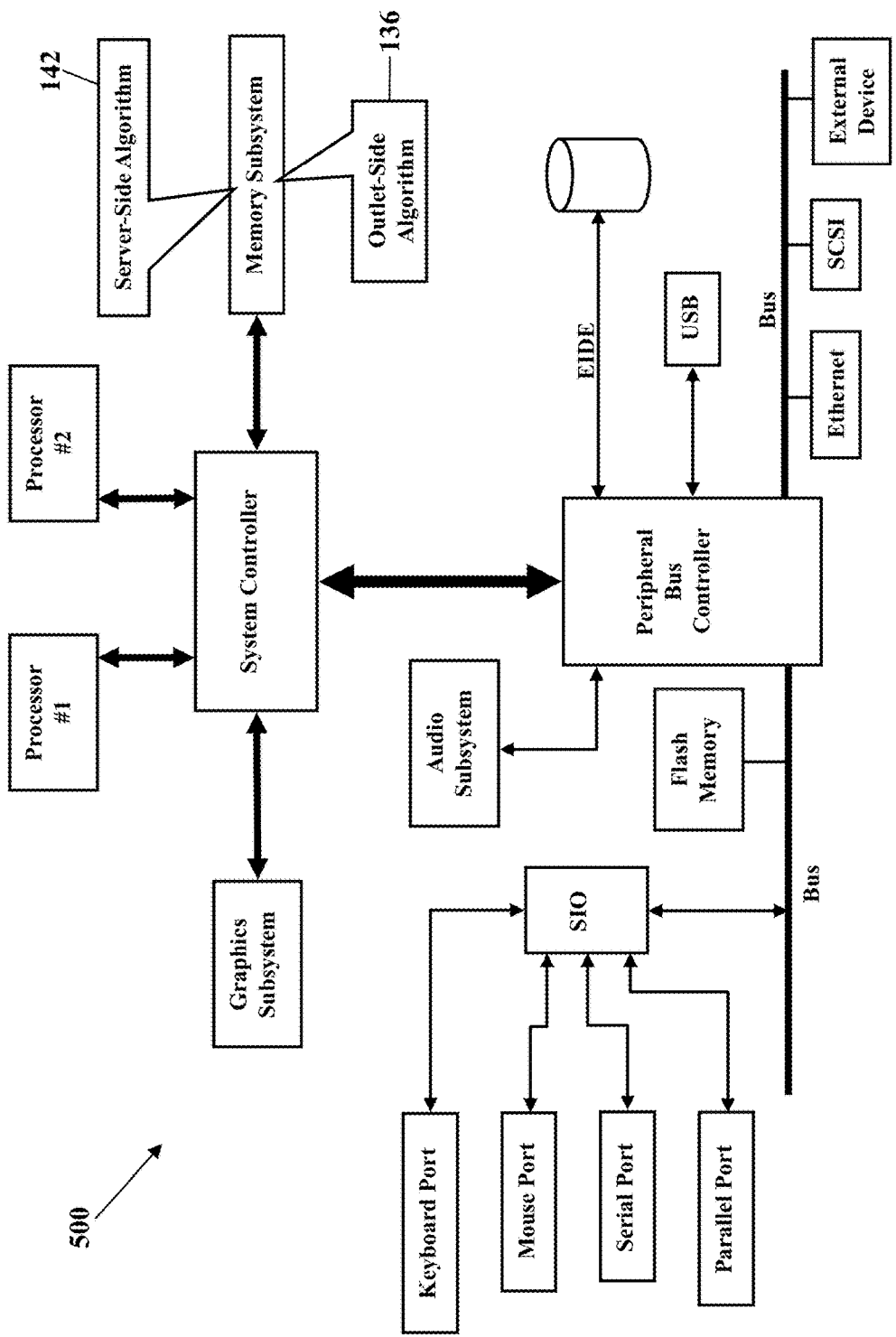
FIGS. 38-39 are schematics illustrating still more exemplary embodiments.

FIG. 38 is a schematic illustrating still more exemplary embodiments. FIG. 38 is a more detailed diagram illustrating a processor-controlled device 500. As earlier paragraphs explained, the outlet-side algorithm 136 and the server-side algorithm 142 may operate in any processor-controlled device. FIG. 38, then, illustrates the outlet-side algorithm 136 and the server-side algorithm 142 stored in a memory subsystem of the processor-controlled device 500. One or more processors communicate with the memory subsystem and execute either, some, or all applications. Because the processor-controlled device 500 is well known to those of ordinary skill in the art, no further explanation is needed.

Figure 39:
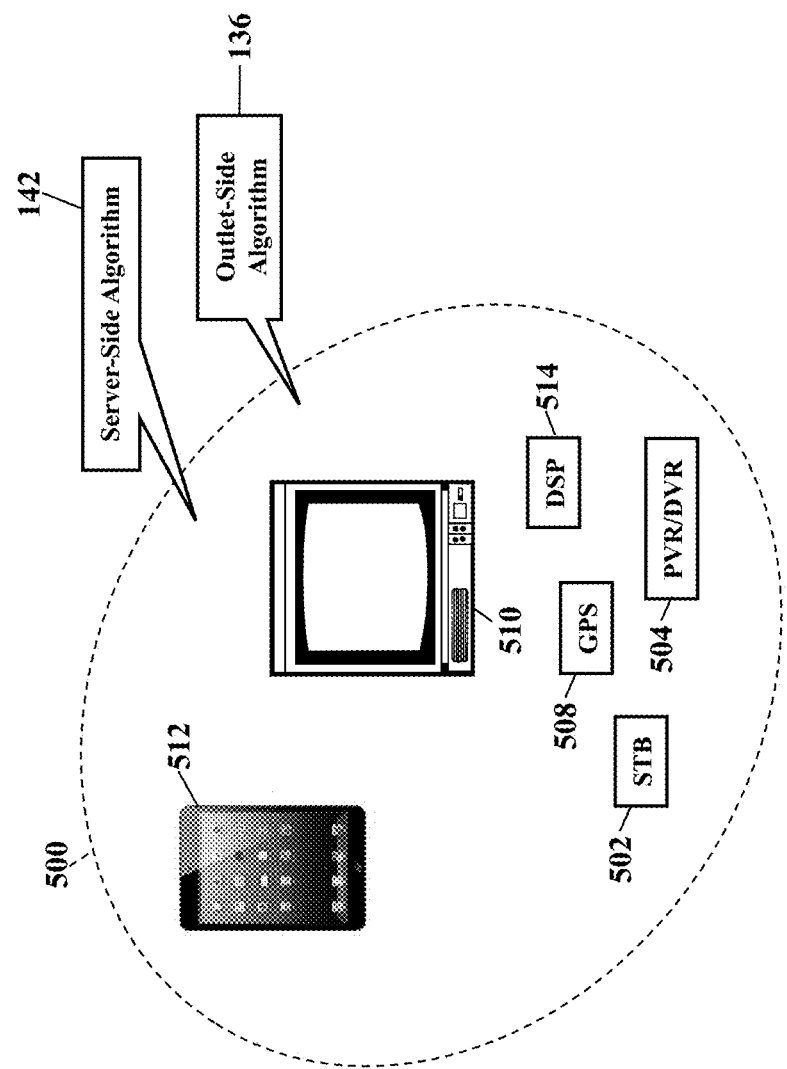

FIG. 39 depicts other possible operating environments for additional aspects of the exemplary embodiments. FIG. 39 illustrates the outlet-side algorithm 136 and the server-side algorithm 142 operating within various other devices 500. FIG. 39, for example, illustrates that the outlet-side algorithm 136 and the server-side algorithm 142 may entirely or partially operate within a set-top box ("STB") (502), a personal/digital video recorder (PVR/DVR) 504, a Global Positioning System (GPS) device 508, an interactive television 510, a tablet computer 512, or any computer system, communications device, or processor-controlled device utilizing the processors 134 and 140 (illustrated in FIGS. 9-12) and/or a digital signal processor (DP/DSP) 514. The device 500 may also include network switches, routers, modems, watches, radios, vehicle electronics, clocks, printers, gateways, mobile/implantable medical devices, and other apparatuses and systems. Because the architecture and operating principles of the various devices 500 are well known, the hardware and software componentry of the various devices 500 are not further shown and described.

Exemplary embodiments may be physically embodied on or in a computer-readable storage medium. This computer-readable medium may include CD-ROM, DVD, tape, cassette, floppy disk, memory card, USB, and large-capacity disks. This computer-readable medium, or media, could be distributed to end-subscribers, licensees, and assignees. A computer program product comprises processor-executable instructions for locational determination, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A portable product for use in conjunction with an electrical outlet, the portable product comprising:
 a transceiver associated with an electrical outlet;
 a memory device that stores an algorithm; and
 a processor that executes the algorithm to perform operations, the operations comprising:
 receiving, via the transceiver, a near field wireless signal transmitted from a mobile device, the near field wireless signal comprising a device identifier associated with the mobile device;
 generating, by the processor, an outlet message that includes the device identifier and an outlet identifier associated with the electrical outlet, the outlet identifier identifying the electrical outlet as an indoor location of the mobile device; and
 transmitting, by the processor, the outlet message via a wireless local area network to a network device, the outlet message enabling an electronic logging of the outlet identifier as the indoor location of the mobile device.

2. The portable product of claim 1, further comprising enclosing the transceiver, the memory device, and the processor in an enclosure.

3. The portable product of claim 1, further comprising receiving electrical power via the electrical outlet.

4. The portable product of claim 1, further comprising wirelessly transmitting the outlet message via the transceiver.

5. The portable product of claim 1, further comprising time stamping the outlet message.

6. The portable product of claim 1, further comprising adding information representing a textual description to the outlet message, the textual description associated with the outlet identifier and textually describing the indoor location.

7. A system, comprising:
 a hardware processor; and
 a memory device, the memory device storing instructions, the instructions when executed causing the hardware processor to perform operations, the operations comprising:
 receiving an outlet message transmitted via a wireless local area network from a portable product, the outlet message including a device identifier and an outlet identifier, the device identifier identifying a mobile device communicating via near field communication with a transceiver associated with an electrical outlet, and the outlet identifier identifying the electrical outlet as an indoor location of the mobile device; and
 adding an entry to an electronic database of locations associated with the mobile device, the electronic database of locations logging the outlet identifier as the indoor location of the mobile device.

8. The system of claim 7, wherein the operations further comprise time stamping the outlet message.

9. The system of claim 7, wherein the operations further comprise wirelessly receiving the outlet message.

10. The system of claim 7, wherein the operations further comprise adding information representing a textual description to the outlet message, the textual description textually describing the indoor location.

11. The system of claim 7, wherein the operations further comprise querying a luminary database for the outlet identifier to determine a luminaire at the indoor location.

12. The system of claim 11, wherein the operations further comprise activating the luminaire.

13. A memory device storing code that when executed causes a hardware processor to perform operations, the operations comprising:
 receiving a near field wireless signal via a transceiver associated with an electrical outlet, the near field wireless signal comprising a device identifier associated with a mobile device passing within a near field communication to the electrical outlet;
 generating an outlet message that specifies the device identifier and an outlet identifier, the outlet identifier identifying the electrical outlet as an indoor location associated with the mobile device; and
 transmitting the outlet message via a wireless local area network to a network device, the outlet message enabling an electronic logging of the outlet identifier as the indoor location associated with the mobile device.

14. The memory device of claim 13, wherein the electrical outlet comprises a luminaire.

15. The memory device of claim 13, wherein the electrical outlet comprises a lighting fixture.

16. The memory device of claim 13, wherein the operations further comprise time stamping the outlet message.

17. The memory device of claim 13, wherein the operations further comprise sending a command in response to the outlet identifier identifying the electrical outlet.

18. The memory device of claim 13, wherein the operations further comprise retrieving a temperature associated with the outlet identifier.

19. The memory device of claim 13, wherein the operations further comprise retrieving a zone associated with the outlet identifier, the zone associated with a heating, ventilation, and air conditioning system.

* * * * *